(12) United States Patent
Cordesses et al.

(10) Patent No.: US 10,698,206 B2
(45) Date of Patent: Jun. 30, 2020

(54) THREE DIMENSIONAL AUGMENTED REALITY INVOLVING A VEHICLE

(71) Applicant: RENAULT INNOVATION SILICON VALLEY, Sunnyvale, CA (US)

(72) Inventors: Lionel Cordesses, Cupertino, CA (US); Thomas Ehrmann, Menlo Park, CA (US); Paul De Chatelperron, Le Veurdre (FR)

(73) Assignee: RENAULT INNOVATION SILICON VALLEY, Sunnyvale, CA (US)

( * ) Notice: Subject to any disclaimer, the term of this patent is extended or adjusted under 35 U.S.C. 154(b) by 0 days.

(21) Appl. No.: 15/994,810

(22) Filed: May 31, 2018

(65) Prior Publication Data
US 2019/0369391 A1    Dec. 5, 2019

(51) Int. Cl.
*G02B 27/01* (2006.01)
*G06T 19/00* (2011.01)

(52) U.S. Cl.
CPC ............ *G02B 27/01* (2013.01); *G06T 19/006* (2013.01); *G02B 2027/0181* (2013.01); *G02B 2027/0183* (2013.01); *G02B 2027/0185* (2013.01); *G06T 2207/30241* (2013.01); *G06T 2207/30261* (2013.01)

(58) Field of Classification Search
CPC ............................. G02B 27/01; G06T 19/006
USPC .......................................................... 345/633
See application file for complete search history.

(56) References Cited

U.S. PATENT DOCUMENTS

| 4,521,021 | A | 6/1985 | Dixon |
| 7,955,168 | B2 | 6/2011 | Mendelsohn et al. |
| 8,235,815 | B1 | 8/2012 | Kavars et al. |
| 8,847,887 | B2 | 9/2014 | Pryor |
| 2009/0005961 | A1* | 1/2009 | Grabowski .......... G01C 21/365 701/532 |
| 2010/0253493 | A1 | 10/2010 | Szczerba et al. |

(Continued)

FOREIGN PATENT DOCUMENTS

KR          20150107187          9/2015

OTHER PUBLICATIONS

International Search Report and Written Opinion dated Aug. 16, 2019 in PCT/US19/24383, citing documents AA-AE therein, 17 pages.

*Primary Examiner* — Hai Tao Sun
(74) *Attorney, Agent, or Firm* — Oblon, McClelland, Maier & Neustadt, L.L.P.

(57) ABSTRACT

A 3-D augmented reality display system, method, and computer-readable medium, the system including a computer hardware platform including circuitry. The circuitry is configured to receive a video image from a view of a front of a vehicle, extract a portion of the video image matching the field of view of a windshield for display on the display device, generate and display a 3-D graphic entity superimposed on the display device and moving along a predetermined trajectory, receive sensory data related to the environment outside the field of view of the windshield, and when the sensory data indicates a real element having a trajectory path that is approaching the field of view of the windshield, generate a bounding box around the real element and adjust the trajectory path of the 3-D graphic entity to a new trajectory path that avoids the trajectory path of the bounding box for the real element.

20 Claims, 15 Drawing Sheets

(56) References Cited

U.S. PATENT DOCUMENTS

| | | | |
|---|---|---|---|
| 2010/0253601 A1* | 10/2010 | Seder | G01S 13/723 |
| | | | 345/7 |
| 2012/0084812 A1 | 4/2012 | Thompson et al. | |
| 2013/0083061 A1 | 4/2013 | Mishra et al. | |
| 2013/0162639 A1 | 6/2013 | Muench et al. | |
| 2013/0307856 A1 | 11/2013 | Keane et al. | |
| 2014/0354692 A1* | 12/2014 | Ng-Thow-Hing | |
| | | | G02B 27/0101 |
| | | | 345/633 |
| 2014/0362195 A1 | 12/2014 | Ng-Thow-Hing et al. | |
| 2015/0022426 A1* | 1/2015 | Ng-Thow-Hing | G06T 19/00 |
| | | | 345/7 |
| 2016/0005333 A1 | 1/2016 | Naouri et al. | |

* cited by examiner

THREE DIMENSIONAL AUGMENTED REALITY INVOLVING A VEHICLE

FIELD OF THE DISCLOSURE

The present disclosure relates generally to three dimensional augmented reality in which a real scene is a view from a vehicle.

BACKGROUND

Augmented reality combines computer-generated entities such as sound video, or graphical images with live, or actual, real world scenes (referred to herein as real scenes) which may be viewed directly through a transparent display or indirectly displayed on a display screen. The combined display may be referred to as an augmented reality display. In some cases the augmented reality may be three dimensional (3-D) and computer generated graphical images may be 3-D images. Real scenes may contain static objects so that the real scenes may serve as a background setting in the 3-D augmented reality display. However, it is possible for a real scene to include moving objects. For example, objects such as an aircraft, a vehicle, a person or an animal may move into the area being viewed as a real scene making them part of the 3-D augmented reality scene being viewed.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a three dimensional (3-D) augmented reality system, method, and computer-readable medium, the system including a display device configured to display a field of view of a windshield of the vehicle, and a computer hardware platform including circuitry. The circuitry is configured to receive a video image from a view of a front of the vehicle, extract a portion of the video image matching the field of view of the windshield for display on the display device, generate and display a 3-D graphic entity superimposed on the display device and moving along a predetermined trajectory, receive sensory data related to the environment outside the field of view of the windshield, and when the sensory data indicates a real element having a trajectory path that is approaching the field of view of the windshield, generate a bounding box around the real element and adjust the trajectory path of the 3-D graphic entity to a new trajectory path that avoids the trajectory path of the bounding box for the real element.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
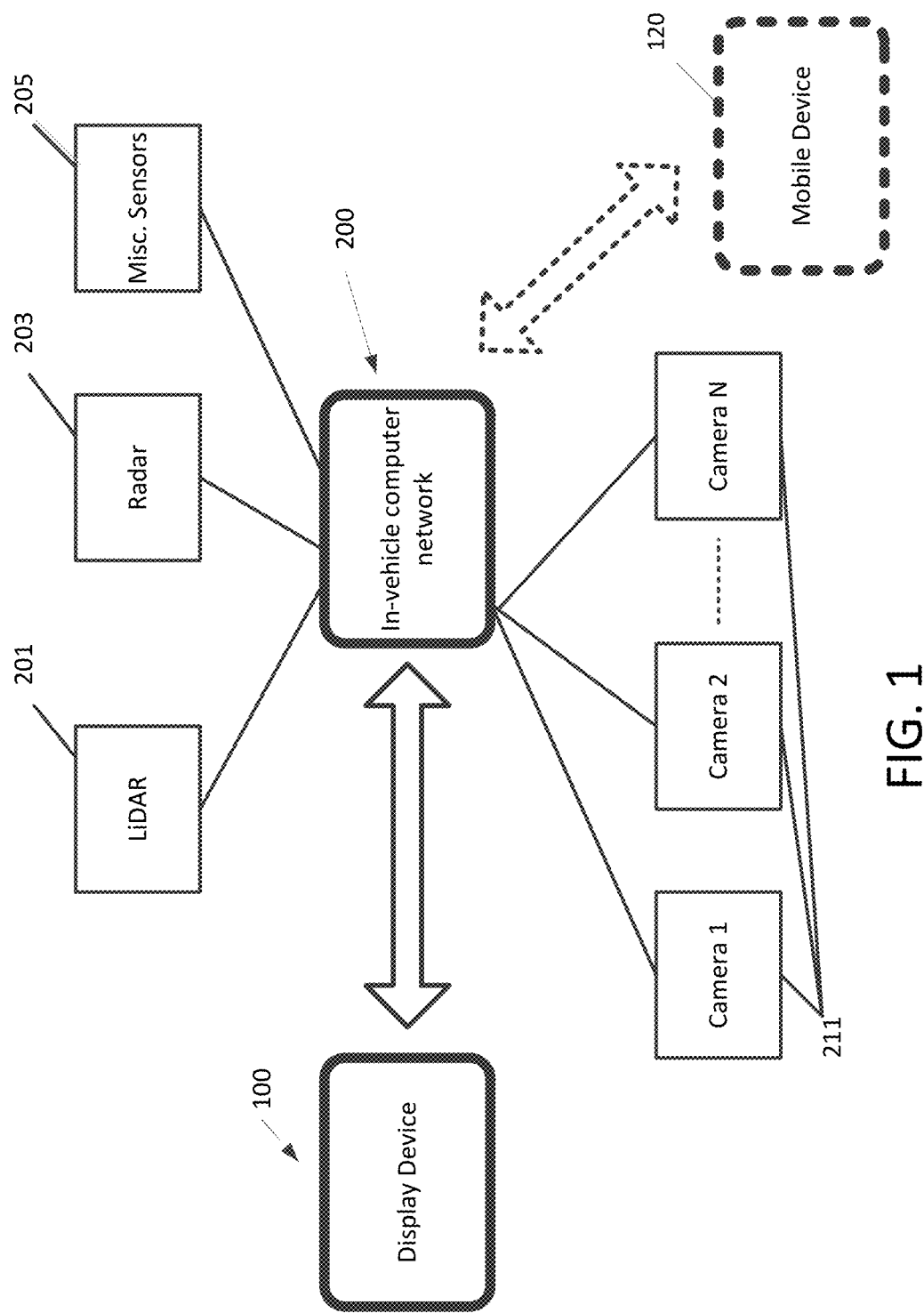
FIG. 1 is a block diagram illustrating a three dimensional augmented reality system in a vehicle according to an exemplary aspect of the disclosure.

Referring now to the drawings, wherein like reference numerals designate identical or corresponding parts throughout several views, the following description relates to a three dimensional augmented reality system in a vehicle that avoids occlusion of 3-D graphic entities by real elements. Occlusion by real elements is avoided by constraining a trajectory of a 3-D entity to outside the perimeter of the moving real element.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

In a case of a vehicle that moves, real scenes of a 3-D augmented reality display constantly change and may be replete with actual moving elements in the outside world, herein referred to as "real elements" or "moving real elements". A 3-D augmented reality display that includes a scene of the outside of a vehicle that moves will have to deal with real elements that may occlude graphic entities being generated and displayed. In particular, a graphical image moving along a trajectory may be blocked by a real object that comes into view at a position that passes between the path of the generated graphical image and the user. As an example, a 3-D augmented reality display that displays another moving vehicle as a graphic entity may incur occlusion when an actual truck pulls in between the user's moving vehicle and the graphic moving vehicle in a manner that would occlude the graphic moving vehicle.

An approach to handling 3-D augmented reality in the case that a moving real element passes in front of a 3-D generated entity such that the view of the graphic entity is occluded, has been to analyze the content of the scene and estimate the 3-D coordinates of the real elements in the real scene. The complexity involved in computing 3-D coordinates of moving real elements in a real scene is high, making such an approach impractical within computational resources of a vehicle. In most cases, computation will be burdened with estimating 3-D coordinates such that operating in real-time cannot be ensured to enable immersing of a player in a 3-D augmented reality involving a dynamic scene.

A solution to the computational burden involved in displaying an augmented reality scene has been to place a 3-D object in the real scene, but limit the size of the real scene so that fewer 3-D coordinates need to be estimated. The disclosed 3-D augmented reality system reduces complexity of computing 3-D coordinates by anticipating trajectories of real elements and adjusting trajectories of generated 3-D objects.

In one or more embodiments, the disclosure relates to a vehicle control system that provides information from sensors to a 3-D augmented reality system such that the system is informed about one or more real elements before they appear in the field of view of a real scene. By being informed about the real elements, the system can constrain a trajectory of generated graphic entities to avoid a potential occlusion.

By way of example, the 3-D augmented reality system uses a real scene as viewed from a vehicle. In an exemplary aspect, the 3-D augmented reality system may include an interactive computing device having a display screen. The interactive computing device may include a touch display device that is built into a vehicle or may include a stand-alone mobile display device. An example of a stand-alone display device is a Tablet computer, a smartphone, a gaming device, or the like. A built-in display device may be a device that is mounted in a center console, seat headrest, rear of a seat, roof, or some part of the interior of a vehicle that is visible and can be interacted with by a person in the vehicle. An example of a built-in display device is a display device that includes at least one computer processor, or may use at least one computer processor that is part of an in-vehicle computer network, such as an in-vehicle-infotainment system in the vehicle.

The real scene may be indirectly captured using one or more cameras mounted to the vehicle. In an exemplary aspect, the view displayed on the display of the interactive computing device is derived based on a video captured from one or more cameras directed toward the front of the vehicle and streamed to the display of the interactive computing device. In an exemplary aspect, the display device associated with the interactive computing device may be a transparent display in which the real scene is displayed as the view through the front windshield of the vehicle. In some embodiments, the real scene may be derived based on a video from one or more cameras directed toward a side or rear of the vehicle, or cameras directed through a sunroof or moonroof, and combinations thereof.

In this disclosure, types of vehicles can include automobiles, airplanes, marine vehicles, submarine vehicles, hovercraft, or any vehicle capable of carrying a person. In some embodiments, the real scene may be derived based on a view from a remote moving camera. For example, the real scene may be a view from a camera mounted in a remote controlled or autonomous ground vehicle or robot, or a drone aircraft. In such case, the real scene may be a field of view from a subset of a plurality of cameras, or may be the field of view of one or more cameras with other sensors for detecting real elements outside the field of view.

In some embodiments, the 3-D augmented reality system may be a video game system that generates and displays interactive graphic entities. Some of the graphic entities may be generated with an original trajectory. The original trajectory may be adjusted based on information obtained from sensors in the vehicle control system. Some of the graphic entities may be triggered based on information obtained from sensors in the vehicle control system.

In one embodiment, the vehicle includes an advanced driver-assisted system (ADAS). The ADAS consists of various sensors integrated into an in-vehicle computer network. The in-vehicle computer network may include various electronic control units (ECUs). The ECUs control the engine or transmission and have sensors to detect conditions such as temperature, pressure, voltage, acceleration, breaking, and steering. Information obtained from sensors is transmitted over the network. An ECU listens for signals transmitted over the network and will perform control actions based on information obtained from the network. Sensors and controllers associated with the ADAS are features that provide a driver with essential information and automate difficult or repetitive tasks, with a goal of improving car safety. One ADAS is Global Positioning System (GPS) navigation which assists a driver in determining location of the vehicle and in providing driving directions.

Another ADAS is an autonomous cruise control (ACC) system (also known as adaptive cruise control, radar cruise control, traffic-aware cruise control, or dynamic radar cruise control). The ACC system uses sensor information from on-board sensors including radar, laser sensor, or stereo camera. The ACC system includes a controller that may control breaking when the sensor information indicates that a vehicle is approaching another vehicle ahead. The radar sensor may be located behind the grille in the center. In some cases, a range radar may be placed in a central location between short range radars placed on corners of the vehicle. The laser sensor must be exposed and may be located on the grille, off to one side. A stereo camera can use digital processing to extract depth information based on parallax between the two cameras' views. The sensors may also detect traffic signs and signals and use the detected information to control vehicle speed.

Another cruise control system is the intelligent adaptive cruise control (i-ACC). The i-ACC is a cruise control system capable of predicting and reacting to the behavior of other vehicles. Sensor information in the i-ACC includes the ability to detect that another vehicle is going to change lanes to the same lane as the vehicle a few seconds before it happens.

Another ADAS is blind spot detection. A blind spot detection system may include cameras that can transmit an image to a monitor of a view that is outside the vision of a mirror. Also, a more comprehensive version of cruise control is a collision avoidance system. A collision avoidance system may include sensors that sense the proximity of other vehicles, pedestrians, animals, and various roadway obstructions.

Although safety-related and driver assist systems are disclosed, the present disclosure is not so limited. Any onboard control system that relies on existing vehicle sensors, such as: a light sensor used by the air conditioning (which estimates the amount of sunlight coming through the glass, so as to compensate for this added energy when controlling the temperature inside the vehicle). This light sensor can be either used to compensate for the perceived temperature in the 3-D augmented reality system or as a light sensor, to modify the ambient light in a rendered scene. The rain sensor can also be used to trigger changes in the appearance of the rendered items: they can look wet or at least shiny when it is raining. A fuel gauge sensor or the state of charge for an electric vehicle, for instance may be used to decrease the dynamics of the items when the tank is close to zero or when the battery is depleted (e.g., everything could go slower when there is little to no fuel or energy left). A tire pressure monitoring system can also be used to trigger some events related to a low pressure in one of the tires, for example, so as to increase the difficulty when a tire has a lower pressure. Thus, sensory information that may be found in an in-car computer network can include location of the vehicle on a map, velocity of the vehicle, real elements in the vicinity of the vehicle's surroundings such as a bridge, a tunnel, nearby buildings, vehicles passing on either side of the vehicle, and vehicles approaching the front or rear of the vehicle. In some cases, cameras mounted on the vehicle may detect people, animals, or other moving objects in a driver's blind spot or approaching the field of view of the driver.

Using sensory information obtained from an in-vehicle computer network having various ADAS's, real elements approaching from outside the field of view of the driver may be detected before they enter the field of view that is used as the real scene in the 3-D augmented reality. In an exemplary aspect, a moving graphic entity may be altered to avoid occlusion by a real element that is expected to enter the field of view used in the 3-D augmented reality.

FIG. 1 is a block diagram of a 3-D augmented reality system in a vehicle according to an exemplary aspect of the disclosure. The 3-D augmented reality system may be used by a passenger of the vehicle using a display device 100. The display device 100 may be any computing device having a display, such as a handheld gaming device, a tablet computer or a smartphone, or a built-in device having a display that is part of a vehicle infotainment system. In some embodiments, some control of the display device 100 may be performed by a mobile device 120 which can communicate through the in-vehicle-computer network 200. For example, the display device 100 may be a built-in display device mounted to a back of the driver or passenger seat. The mobile device 120 may control operations of the seat-mounted display device 100 through communication with the in-vehicle computer network 200. To obtain sensory information, the display device 100 may be connected to an in-vehicle control system, such as the in-vehicle computer network 200, using any wireless or any wired communication medium, such as a universal serial bus (USB) or high definition multimedia interface (HDMI), depending on the interface(s) available in the vehicle. The display device 100 may communicate by any short range wireless communication protocol, such as WiFi® or Bluetooth®. The in-vehicle computer network 200 may include various sensing devices for sensing the environment in the vicinity of the vehicle as well as for determining the location of the vehicle. Sensing devices that may be existing sensors of the ADAS may include a LiDAR 201 (which is a type of radar that uses light), one or more Radar transceivers 203, a number N of digital cameras 211, and other sensing devices 205 such as Ultrasonic transceivers.

LiDAR uses light waves and refers to light detection and ranging. LiDAR relies on echoes of light waves to measure the shape and contour of a surface. LiDAR may bounce laser pulses off of a target to measure distances that indicate height features of the target. LiDAR (sometimes indicated as Light Detection and Ranging) may be used to detect a bridge or tunnel, or other features of the landscape.

Radar uses radio waves and refers to radio detection and ranging. Radar can be used to detect moving objects as well as position and distance of a distant object.

Ultrasonic devices use sound waves to detect objects and measure distances. Ultrasonic devices may send out a series of short sound pulses and listen for echoes to determine the presence of distant objects.

Figure 2:
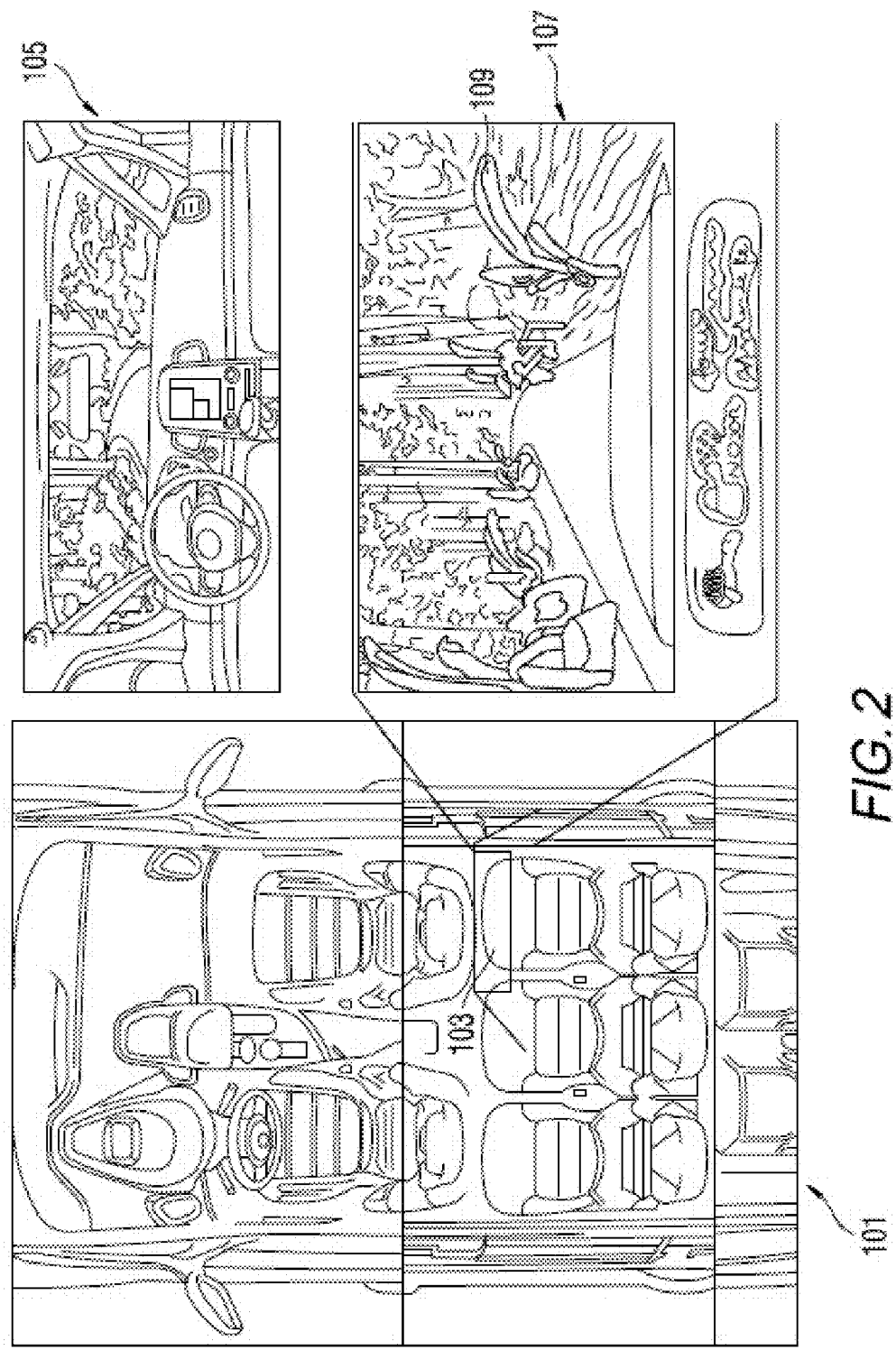
FIG. 2 illustrates an example augmented reality display according to an exemplary aspect of the disclosure.

FIG. 2 illustrates an example augmented display according to an exemplary aspect of the disclosure. In an exemplary aspect, the 3-D augmented reality may be used by a passenger in a vehicle 101 having a display device 100. The display device 100 includes a display 107 that is capable of displaying a 3-D augmented reality display that displays a real scene based on the view in the front windshield 105 of the vehicle and augmented with graphic entities 109. In some embodiments, the display 107 may display a real scene based on the view in another window of the vehicle, such as a side window, rear window, sunroof, or moonroof, or a combination thereof.

Figure 3:
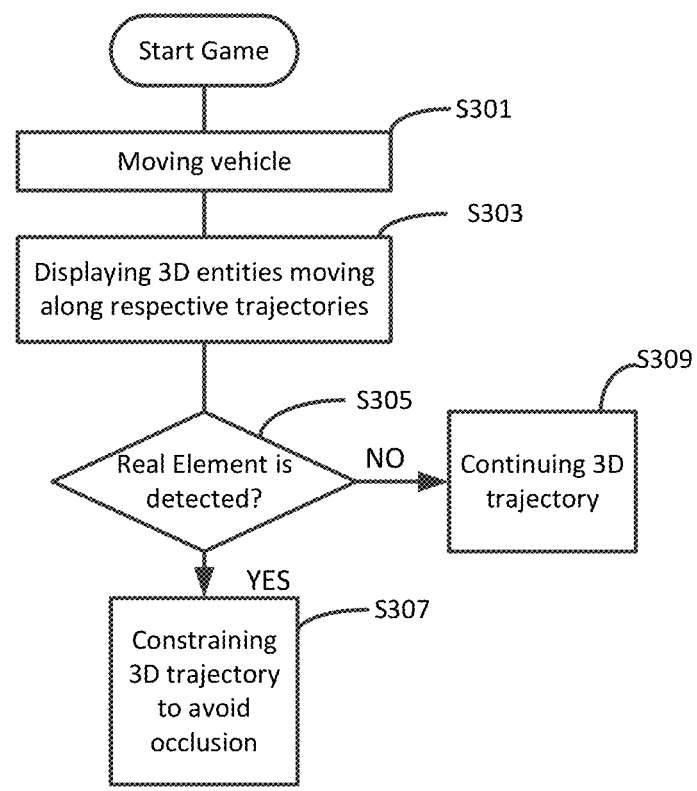
FIG. 3 is a flowchart for a method of avoiding occlusion by a real element according to an exemplary aspect of the disclosure.

FIG. 3 is a flowchart for a method of avoiding occlusion by a real element according to an exemplary aspect of the disclosure. The 3-D augmented reality may use a view obtained from a camera, which has a field of view of a windshield of a vehicle, as the real scene, or may use a view that is derived from a camera that captures video from a front of a vehicle. Thus, in S301, the method may begin with a moving vehicle. In S303, the 3-D augmented reality system generates a 3-D augmented reality display using the real scene captured by the camera and incorporating one or more 3-D entities moving along their respective trajectories.

The 3-D augmented reality system monitors information coming through the in-vehicle computer network 200 to determine, in S305, if there is a real element that may enter into the field of view in the front windshield. When the vehicle is moving, the scene as viewed through the front windshield will be constantly changing. When the vehicle comes to a stop, the scene may still display moving elements. The information obtained from the in-vehicle computer network 200 may indicate one or more moving elements that are not within the field of view of the front windshield, but may have respective trajectories that take them into the field of view. In some embodiments, the 3-D augmented reality system monitors information to determine if there is a real element that may enter into the field of view in a side window, rear window, or sunroof. Information coming through the in-vehicle computer network 200 may include sensor information obtained from sensors that are part of the ADAS. For example, radar, or cameras, or combination of sensors mounted on the vehicle may detect other vehicles, people, animals, or other objects moving on the ground in a driver's blind spot or approaching the field of view of the driver as seen through the windshield. Radar may detect an airplane or bird flying in the air in a path towards, across, or over the path of the vehicle as it also moves. Information from a GPS may indicate that the vehicle is approaching buildings, a school, a bridge, a tunnel, a park, or a rural area.

In the case that there is a real element that may enter into the field of view (YES in S305), in S307, the 3-D augmented reality system may alter the trajectory of a 3-D graphic entity such that it avoids occlusion by the real element that is expected to enter into the real scene. In the case that a real element is not detected that is outside the field of view (NO in S305), in S309, the 3-D graphic entity of the 3-D augmented reality system moves according to its original trajectory.

Figure 4:
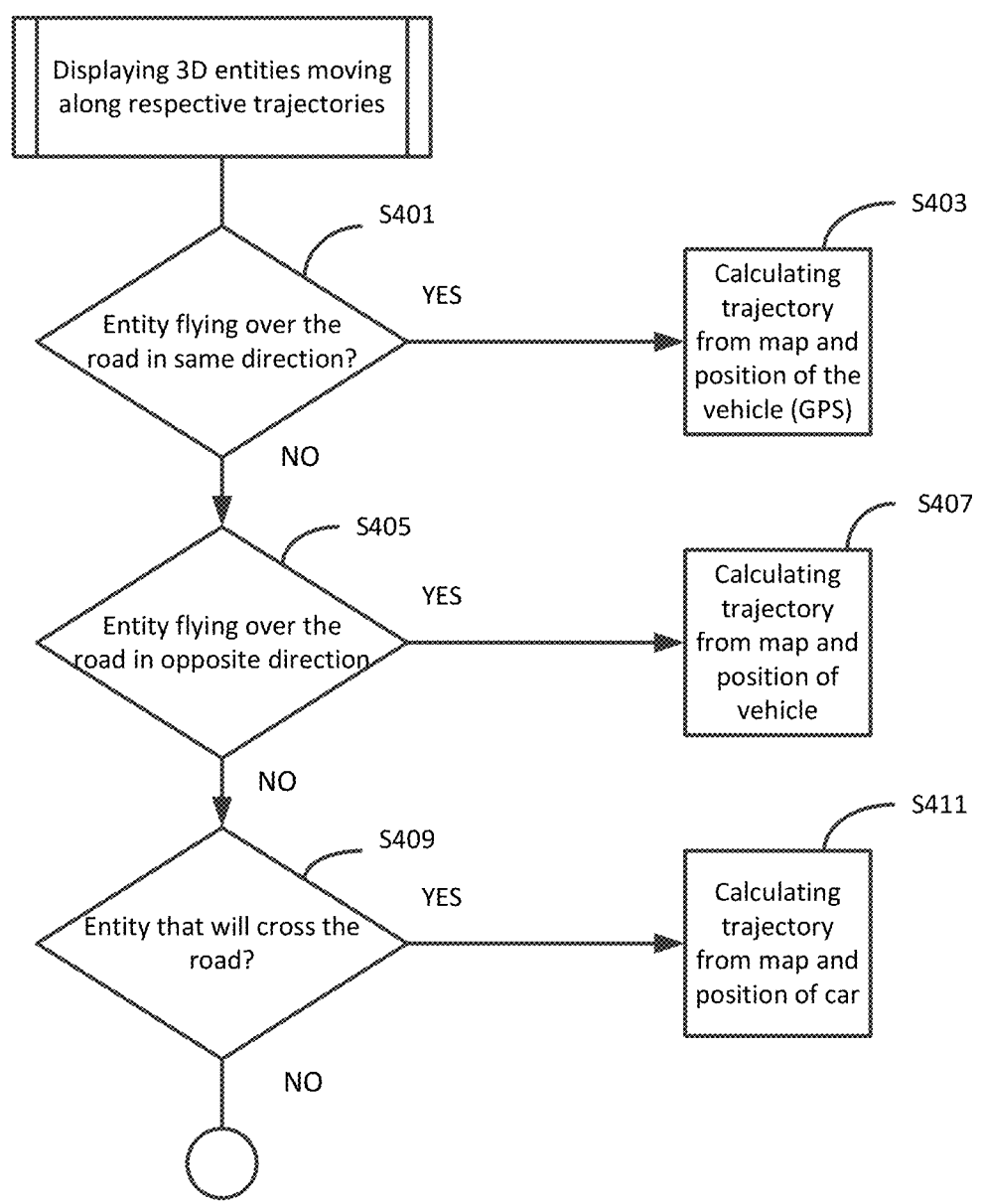
FIG. 4 is a flowchart for a method of displaying 3-D entities moving along trajectories according to an exemplary aspect of the disclosure.

FIG. 4 is a flowchart for the step S303 of displaying 3-D graphic entities moving along trajectories according to an exemplary aspect of the disclosure. Movement of graphic entities may follow trajectories that are derived based on sensory information obtained from the in-vehicle computer network 200. For example, movement of entities flying over the road very slowly and moving in the same direction as the vehicle (YES in S401), in S403, the 3-D mathematical trajectory is calculated from the map and the position of the vehicle using information from a location-based service, such as GPS. In one embodiment, both the map and the position use a latitude and longitude for the current physical location of the vehicle. The physical location may be updated based on time duration and a distance. The time and distance may be used to calculate the speed of the vehicle as well as update the location on the map. One or more graphic entities may be generated and displayed such that when the speed of the vehicle is below a predetermined speed their trajectories are projected based on the previous location and updated location of the vehicle on the map.

In the case of entities flying over the road in the opposite direction as the vehicle (YES in S405), in S407, the 3-D mathematical trajectory is calculated from the map and the position of the car using information from the GPS. For example, as the vehicle moves from a previous physical location to an updated physical location, one or more graphic entities may be generated and displayed as though it/they is/are at a distant position from the vehicle when the vehicle is at the updated location with a trajectory that moves the entities closer based on a direction of the vehicle between the updated location and the previous location.

In the case of entities crossing in front of the vehicle (YES in S409), such as a person crossing the road, in S411, the 3-D mathematical trajectory is calculated from the map and position of the car using information from the GPS. For example, when the location of the vehicle determined based on the position of the vehicle on the map is near a landmark on the map, such as an intersection, one or more entities may be generated and displayed to move across the display in a horizontal trajectory.

Although FIG. 4 shows three independent conditions S401, S405, S409, two or three of the conditions may occur at the same time and the conditions may occur in various orders. For example, some graphic entities may be generated and displayed to fly in trajectories in the same direction as the vehicle, while other graphic entities may be generated and displayed to fly in trajectories in the opposite direction of the vehicle. Also, in the case that the vehicle comes to a stop, entities that are in the process of flying according to trajectories will continue along their respective trajectories, even as other entities are generated and displayed to follow trajectories that pass horizontally in the display. Trajectories of any flying entity and/or any entity that passes horizontally may intersect each other.

In addition, the step S405 of determining whether the trajectory of a graphic entity is flying over the road in the opposite direction does not require first determining, in step S401, whether a trajectory of a graphic entity is flying over the road in the same direction.

Figure 5:
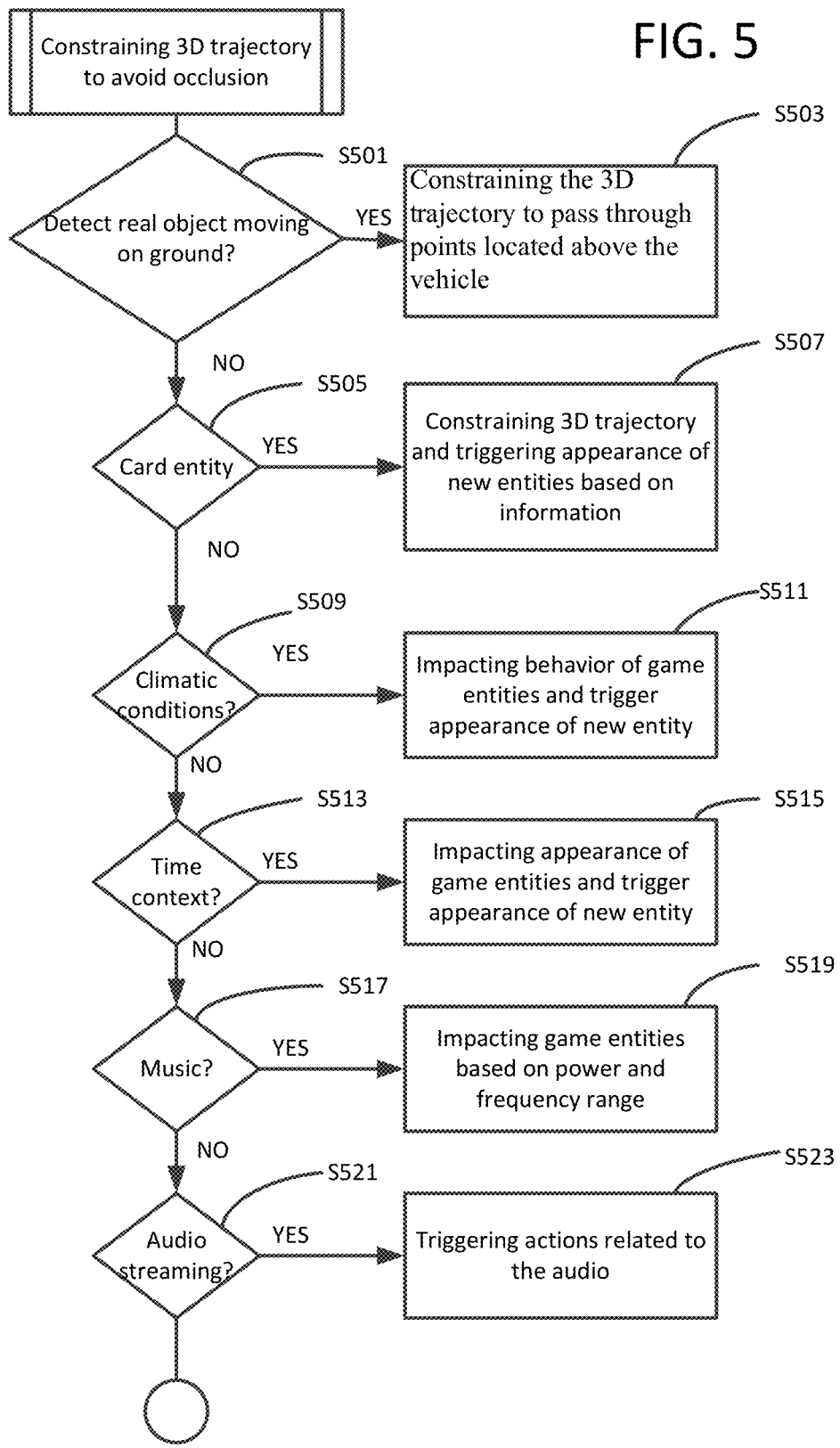
FIG. 5 is a flowchart for a method of constraining trajectory to avoid occlusion according to an exemplary aspect of the disclosure.

FIG. 5 is a flowchart for the step S307 of constraining trajectory to avoid occlusion according to an exemplary aspect of the disclosure. It should be understood that the flowchart in FIG. 5, and associated examples shown in the figures, includes some examples of 3-D augmented reality displays in order to explain various aspects. The example displays should not be construed as limiting and various displays may be generated without departure from the spirit and scope of the disclosure.

Although FIG. 5 shows a sequence of decision steps, the order of decision steps may be in any order. Also, in some embodiments, various resulting actions from more than one decision step may be combined in a single 3-D augmented reality display. For example, an object moving on the ground, a card entity, climate conditions, etc., may be combined in various manners. Also, priority may be given to some conditions over others. For example, priorities may be assigned to conditions when more than one when conditions are detected at the same time, such as when a climatic condition, music, and audio streaming, are detected. Alternatively, certain conditions may override other conditions. In some embodiments, priorities may be assigned to conditions by incorporating priority rules. In some embodiments, conditions may be triggered at different levels: Speed of car=always speed of entity; shape/colors of entity can change according to weather condition (white while it is snowing). In some embodiments, priority rules may be in the form of condition-action rules that are performed according to an expert system. An expert system may make decisions about priority by reasoning using If-Then rules.

To avoid the problem of occlusion by real elements that enter a scene from outside a field of view (including one or more of vehicles/users, pedestrians, bicycles, aircraft, or other moving objects) and certain real elements of the scenery (panels, walls, trees), the 3-D augmented reality system uses sensory information that has been detected by ADAS systems.

Figure 6:
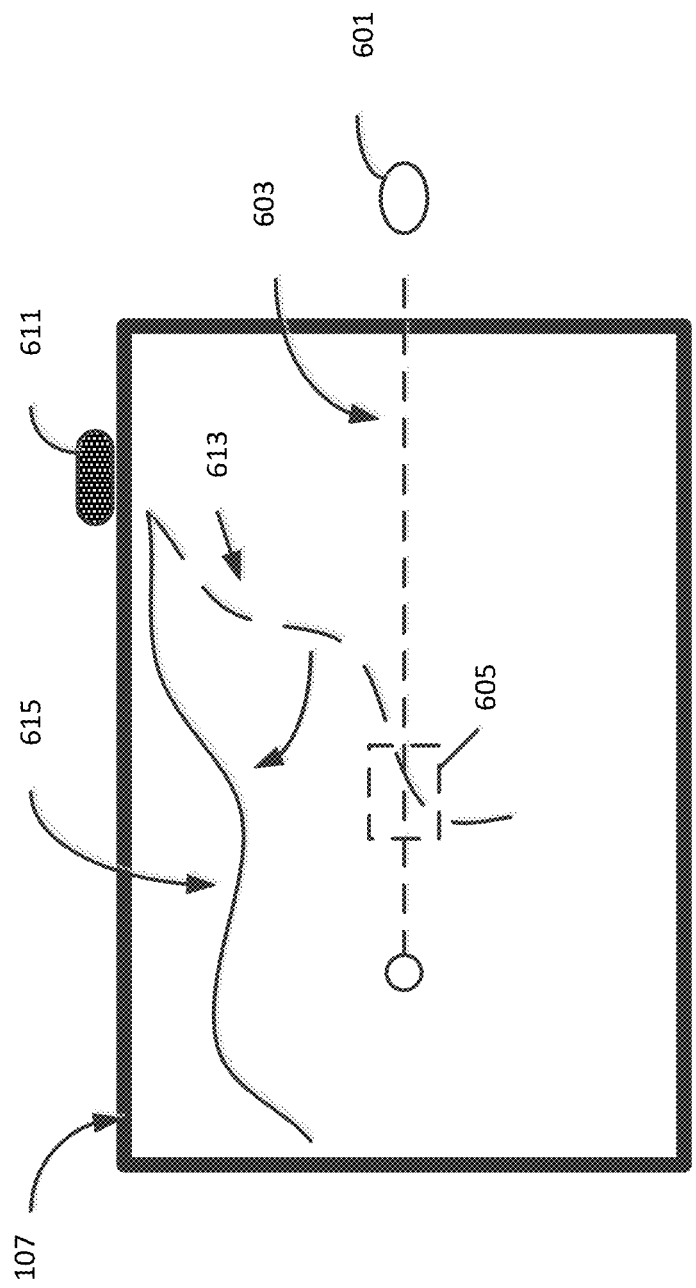
FIG. 6 is a schematic of a 3-D augmented reality display according to an exemplary aspect of the disclosure.

If such real obstacles are identified (YES in S501), then, in S503, the 3-D trajectory of a graphic entity is constrained to avoid a potential occlusion. In an exemplary aspect as shown in FIG. 6, if a real object 601 that is moving horizontally on the ground, such as approaching from the left or right of the vehicle (from outside of the displayed view through the front windshield 107), a solution is to constrain the 3-D trajectory of a graphic entity 611 to pass through points located above the real element (for example, adjusted trajectory 615 passing through points in the sky). In an exemplary aspect, the real element 601 may be characterized by a bounding box 605 having a projected trajectory 603. The original 3-D trajectory 613 is projected for the graphic entity, and if the original trajectory 613 takes the entity 611 through the bounding box 605, an alternative trajectory 615 is determined that takes the entity around or away from the bounding box 605. Real elements that are potentially approaching a view from the front windshield may be detected using existing sensory information obtained over the in-vehicle computer network 200. Generation of an alternative trajectory 615 for a graphic entity 611 to avoid occlusion by a detected real element 601 reduces complex computation that would be required to perform masking of a computer-generated graphic entity with a real moving object in a 3-D augmented reality display. Reduced computational complexity enables sufficient immersion of the user in the environment surrounding the vehicle.

If no obstacle is detected, then the graphic entities related to the 3-D augmented reality display can follow their original trajectory.

In the case of a card containing information (YES in S505) including road signs having text or symbols, for example symbols indicting tunnels, or equivalents thereof, in S507, the information from these real elements will be taken into account when generating graphic entities related to the 3-D augmented reality display. In an exemplary aspect, behavior and/or appearance of graphic entities may be triggered by detection of a crosswalk sign, a stop sign, a deer crossing sign, a train track warning sign, or other types of road signs, which may allude to potential for existence of other specific objects. For example, a stop sign may trigger the appearance of another vehicle at an intersection, or may cause another vehicle in the 3-D augmented reality display to slow down and stop. A crosswalk sign may trigger the appearance of one or more people. A train track warning sign may trigger the appearance of a gate lowering across the road and a train passing. In other embodiments, a sign, such as a sign displaying a tunnel symbol, may indicate that a real tunnel will come into the field of view of the 3-D augmented reality system. Information obtained from cards, such as road signs, provides additional information about the environment aside from distance and object detection signals obtained by vehicle-mounted detection sensors.

In some embodiments, multiple cards may be detected in the vicinity of each other. For example, a stop sign and a crosswalk sign may be detected at the same intersection. In such case, another vehicle(s) may be generated and displayed as slowing down when approaching the intersection, and when both the vehicle and the another vehicle(s) come to a stop, people/pets may be generated and displayed as walking across the road in the crosswalk marked on the road. In some embodiments, instead of a stop sign, there may be a stop light that includes a turning signal. In such case, another vehicle(s) may be generated and displayed as continuing to move into the intersection to make a turn, while people generated by detection of the crosswalk sign will remain standing at the side of the road. In some embodiments, the 3-D augmented reality system may be set up to follow rules of the road such that people standing at the side of the road at a crosswalk may be given right-of-way and begin crossing the road as another generated vehicle is displayed as coming to a stop before reaching the crosswalk.

In some embodiments, upon detecting a sign indicating that a real tunnel is ahead, trajectories of graphic flying entities may be adjusted to an angle that is higher than the original trajectory. The trajectories of the graphic flying entities may be adjusted by the same angle, or may be adjusted by different randomly determined angles. In a similar manner, upon detecting a sign indicating a railroad crossing, trajectories of graphic flying entities may be adjusted by various angles in anticipation of having to pass over a train. In some embodiments, another vehicle generated to be displayed along-side of the vehicle as it is slowing down may slow to a stop based on the change in position and speed of the vehicle as determined from the GPS.

In a case that one or more real elements are detected by vehicle-mounted detection sensors, generation of graphic entities may be stopped or postponed to avoid occlusion with bounding boxes of the one or more real elements. For example, when one or more people are detected by a camera or radar as approaching a crosswalk, the 3-D augmented reality display may stop generation of another vehicle for display at a display position that would occlude the detected people when they enter the crosswalk. In another example, when a real flying object is detected as having a potential trajectory that may take the flying object into the field of view through the front windshield, the 3-D augmented reality display may postpone generation of graphic flying entities for a predetermined time period, such as about 5 to 15 seconds.

In a case that the vehicle is moving above a predetermined speed, such as 55 mph, and a real element is detected by vehicle-mounted detection sensors, generation of graphic flying entities may be postponed for a predetermined period of time that is based on the speed of the vehicle. For example, when a real element is detected that has a trajectory that may enter into the field of view and the vehicle is moving at a high speed, such as above 55 mph, new graphic entities my not be generated for a few seconds to give time for the real element to move through the field of view of the display or to come into a closer view with a more precise trajectory before generating new graphic entities.

Figure 7:
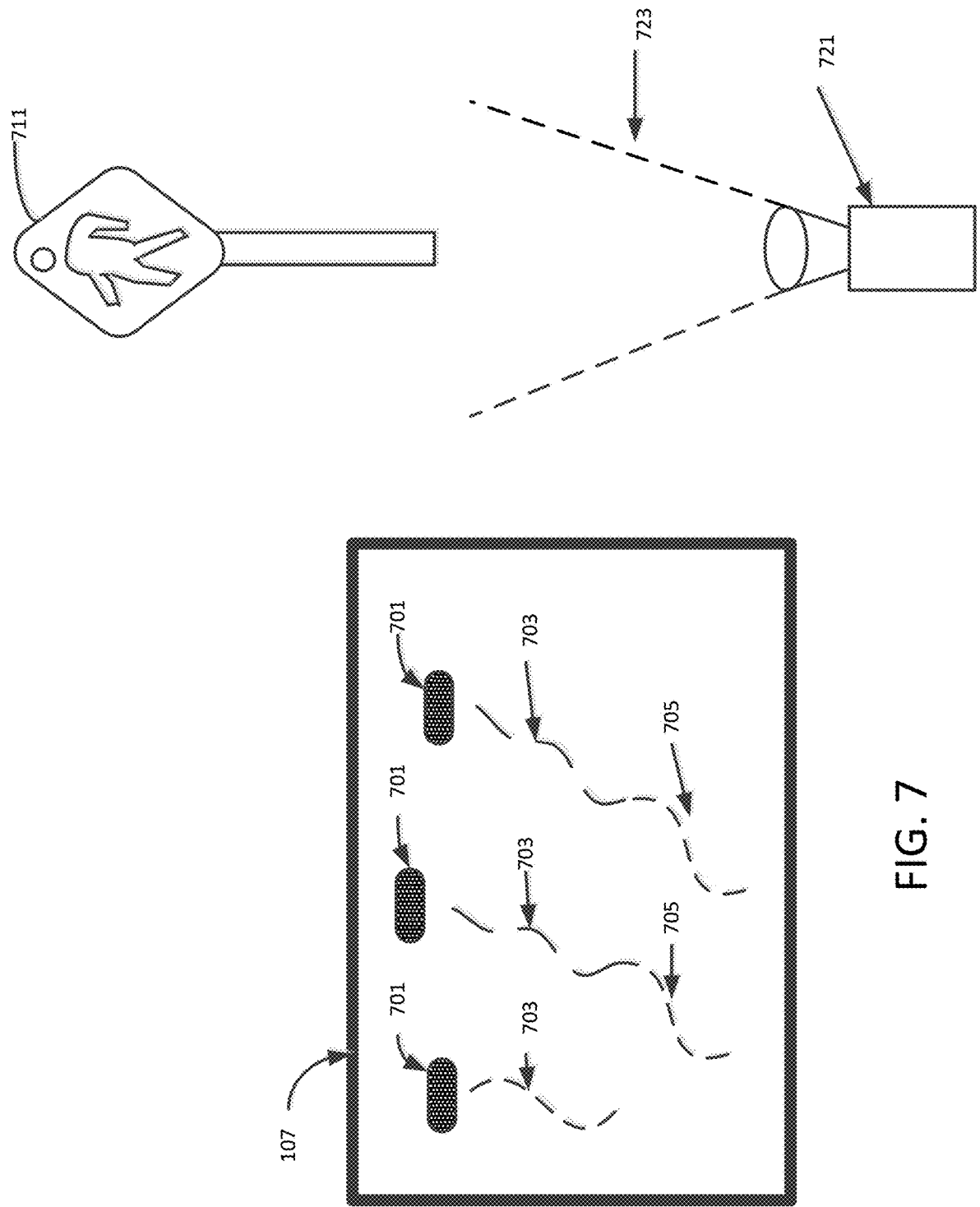
FIG. 7 is a schematic of a 3-D augmented reality display according to an exemplary aspect of the disclosure.

FIG. 7 is a schematic of a 3-D augmented reality display according to an exemplary aspect of the disclosure. A camera 721 mounted to the vehicle may have a field of view 723 that is outside of the field of view of the scene of the 3-D augmented reality display. The camera 721 may pick up an image of a road sign, such as a crosswalk sign 711. Although a crosswalk sign has been used as an example, other road signs may include a train rail crossing sign. The screen 107 of the 3-D augmented reality system may display one or more graphic entities 701 moving along respective trajectories 703. Information obtained from the in-vehicle computer network 200 may include information obtained from the detected road sign. In such case, the 3-D augmented reality system may adjust the trajectories of the one or more graphic entities 701 to slow the respective movement speed along adjusted trajectories 705 in anticipation of activities that may be associated with the detection of the crosswalk sign 711. Although a single crosswalk sign is used in the example, there may be a crosswalk sign on both sides of the road. Also, more complex conditions in which multiple signs may appear along the road. In such case, the 3-D augmented reality system may adjust the trajectories of the one or more graphic entities 701 by adjusting both the movement speed of graphic entities 701 and their respective trajectory paths as necessary to avoid potential occlusion of real elements such as people, bicycles, that may move into view range of the display. Recognizing the information shown in a road sign that is outside the range of the 3-D augmented reality display may provide additional information that may be taken into account in generating a 3-D augmented reality display.

Figure 8:
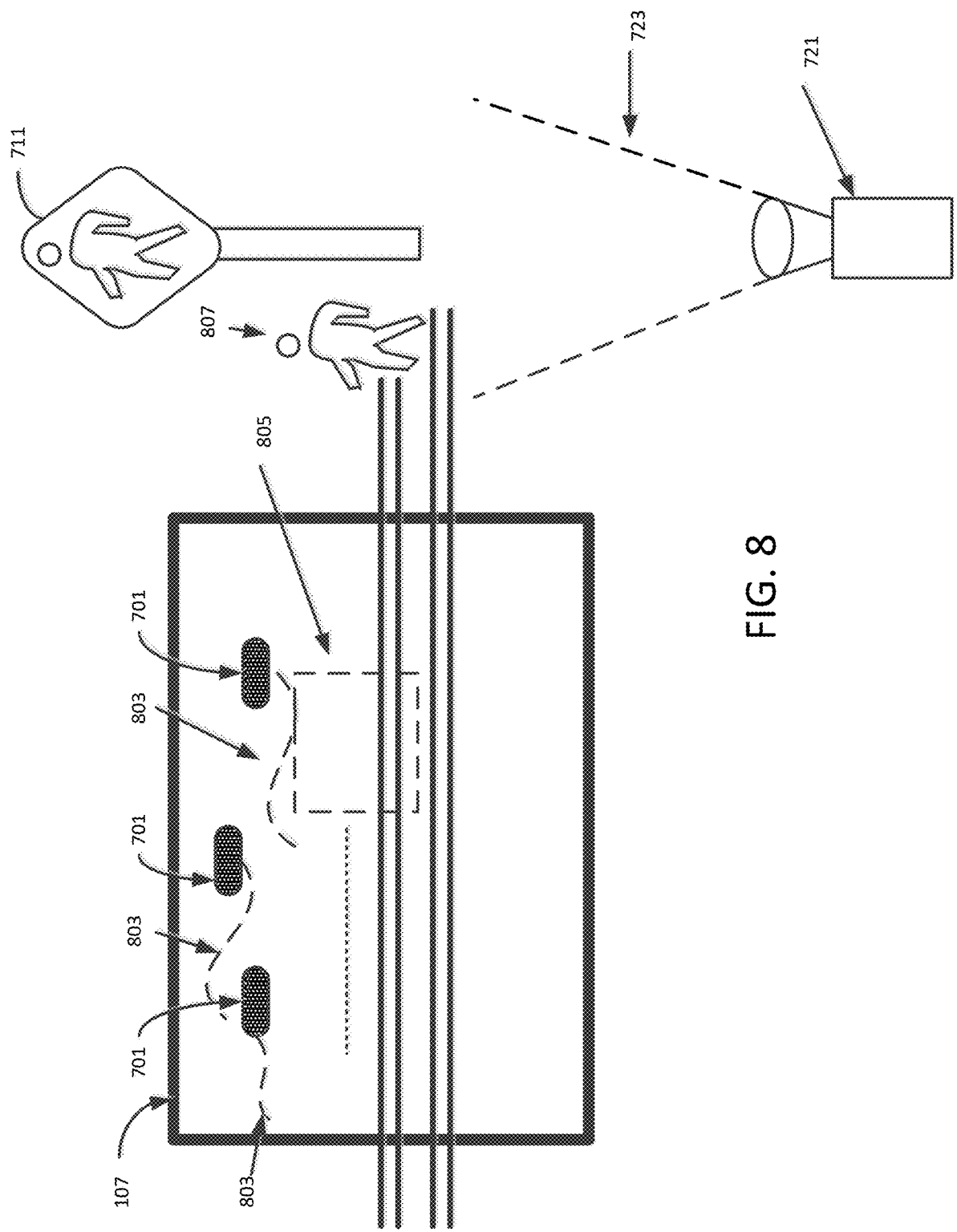
FIG. 8 is a schematic of a 3-D augmented reality display according to an exemplary aspect of the disclosure.

FIG. 8 is a schematic of a 3-D augmented reality display according to an exemplary aspect of the disclosure. A camera 721 mounted to the vehicle may have a field of view 723 that is outside of the field of view of the scene 107 of the 3-D augmented reality display. The camera 721 may pick up an image of a road sign, such as a crosswalk sign 711 and a pedestrian 807 moving into a crosswalk in the vicinity of the road sign. In such case, the 3-D augmented reality system may generate a bounding box 805 for the moving pedestrian and adjust the trajectories 803 of graphic entities 701 whose original trajectories would take them into the path of the bounding box 805. The trajectories 803 may be adjusted to avoid movement into the area of the bounding box 805, and thus reduce computational complexity.

In an exemplary aspect, information from maps may limit/constrain the trajectories of 3-D graphic entities, as well as may also trigger the appearance of these same entities. In one exemplary aspect, a real tunnel identified by the map may trigger the graceful flight of a graphically generated cloud.

Figure 9:
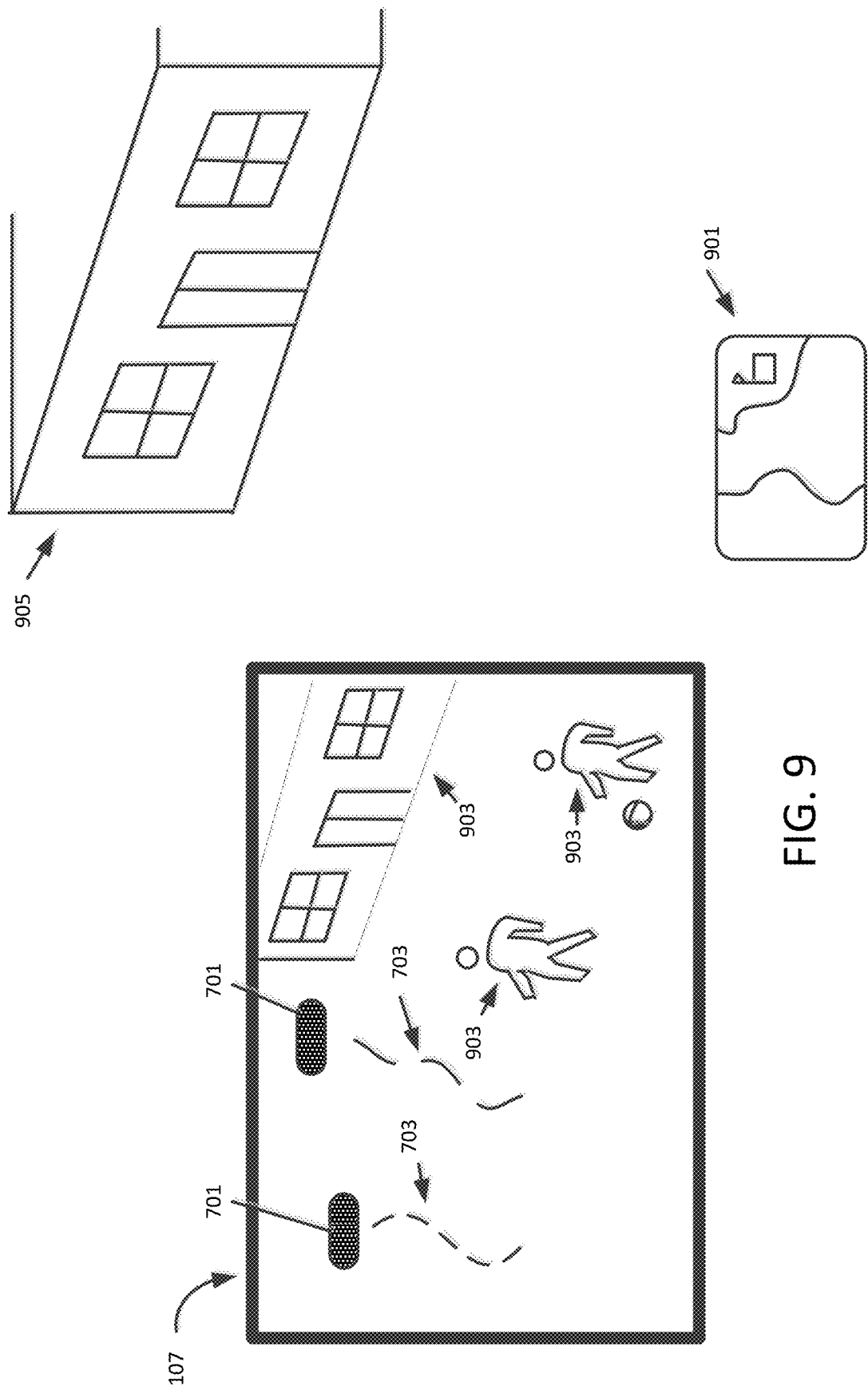
FIG. 9 is a schematic of a 3-D augmented reality display according to an exemplary aspect of the disclosure.

FIG. 9 is a schematic of a 3-D augmented reality display according to an exemplary aspect of the disclosure. A map 901 associated with the GPS system of the vehicle may indicate that the vehicle is traveling near a school building 905. In such case, the 3-D augmented reality display may trigger population of a scene 107 with graphic entities 903 associated with the context of a school. As the vehicle approaches the area where the school is located, a camera mounted on the vehicle may detect real people or other moving real elements. Upon detection of moving real elements, the 3-D augmented display may determine bounding boxes and trajectories for moving real elements as they are detected. The 3-D augmented reality display may adjust trajectories 703 of graphic entities 701 to avoid the bounding boxes. In some embodiments, when bounding boxes would take up a majority of the display 107, the 3-D augmented reality display may stop or postpone generation of moving graphic entities 701.

Figure 10:
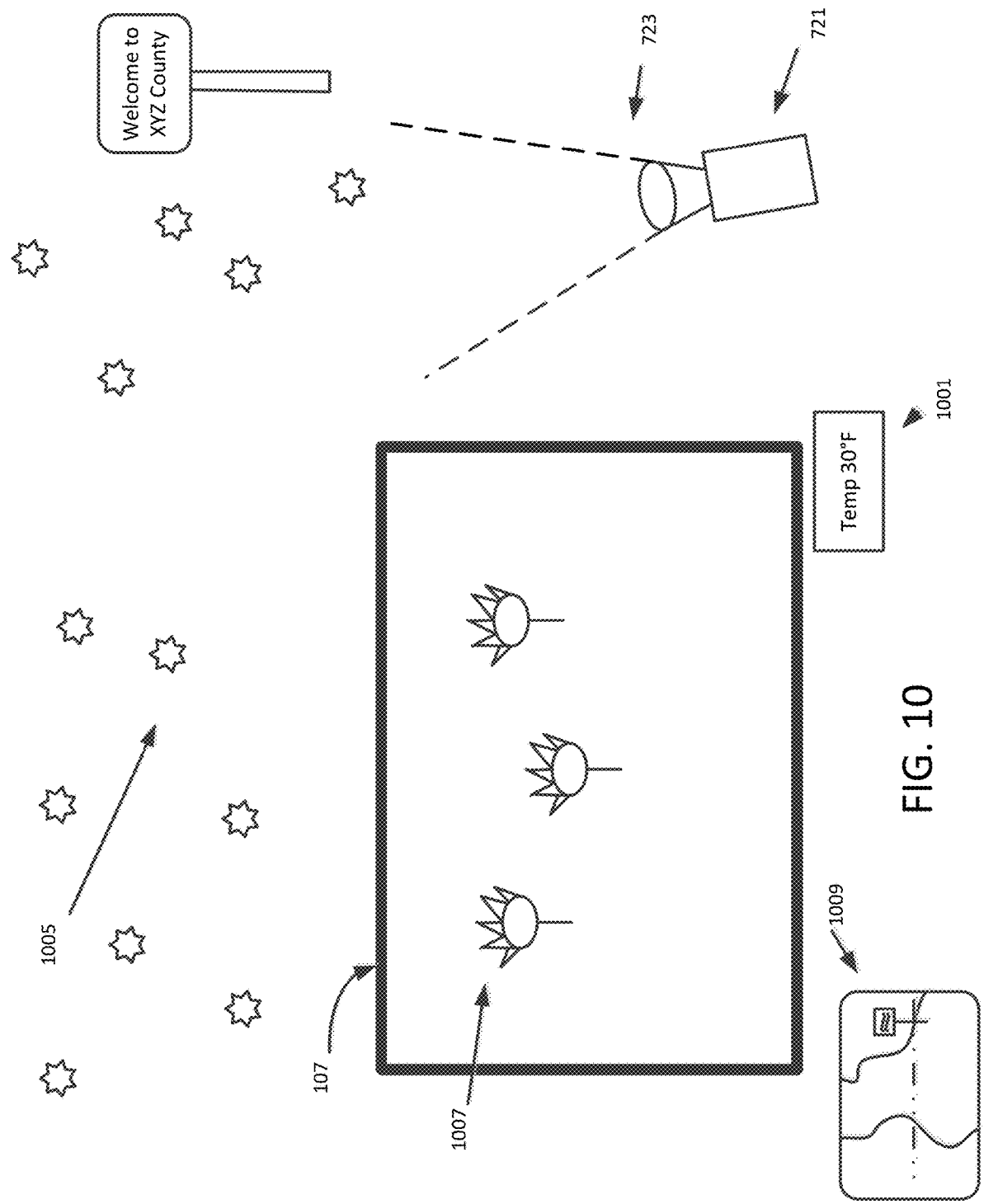
FIG. 10 is a schematic of a 3-D augmented reality display according to an exemplary aspect of the disclosure.

The use of a combination of various on-board sensors (cameras, temperature sensor, GPS) may allow inferences that can, by concatenation, produce specific content in the 3-D augmented reality system. FIG. 10 is a schematic of a 3-D augmented reality display according to an exemplary aspect of the disclosure. In the exemplary aspect, the vehicle is traveling into an area marked as rural (detected on the map 1009), the camera 721 is picking up an image in a field of view 723 that contains mostly "white," and a temperature sensor indicates a drop in temperature 1001.

Figure 11:
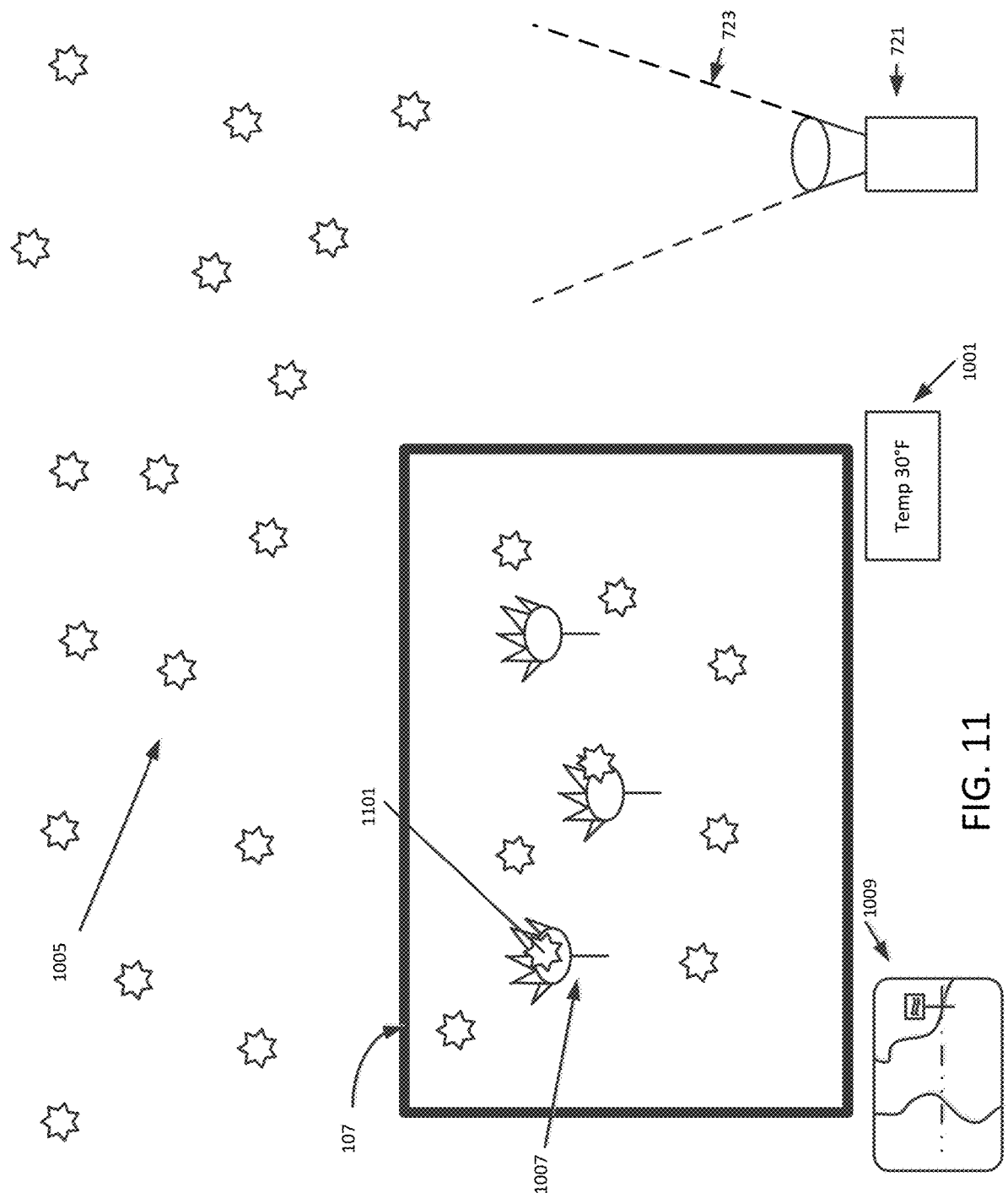
FIG. 11 is a schematic of a 3-D augmented reality display according to an exemplary aspect of the disclosure.

In such case, the combination of information obtained over the in-vehicle computer network 200 may be used to infer that snowflakes 1005 may be falling (even though the camera 721 may not detect them). Real snowflakes 1005 will be allowed to obscure the scene 107 that is displayed in the 3-D augmented reality display rather than display a scene in which the appearance of graphically generated flowers 1007 is modified. FIG. 11 is a schematic of a 3-D augmented reality display according to an exemplary aspect of the disclosure. If the combined information results in an inference that snowflakes may be falling, the 3-D augmented reality display may generate and display graphic snowflake entities 1101 to appear in the scene 107 or may generate graphic snowflake entities hitting the windshield. The combination of sensor information may be used to infer a condition that triggers behavior and/or appearance of graphic entities.

Information about climatic conditions (YES in S509), such as detection of rain may, in S511, impact the dynamic behavior of a player-controlled entity, such as a computer-generated vehicle (which slides more), and/or may cause graphic entities to be added, such as the appearance of umbrellas. In some embodiments, the detection of real elements having potential trajectories that may bring the real elements into view of the display may lead the 3-D augmented reality display to generate fewer graphic entities, or generate graphic entities outside of the potential trajectories of the real elements. Also, detection of one or more card entities (Step S505) and subsequent actions by the 3-D augmented reality display (Step S507) may occur during a period when climate conditions are detected (Step S509).

Figure 12:
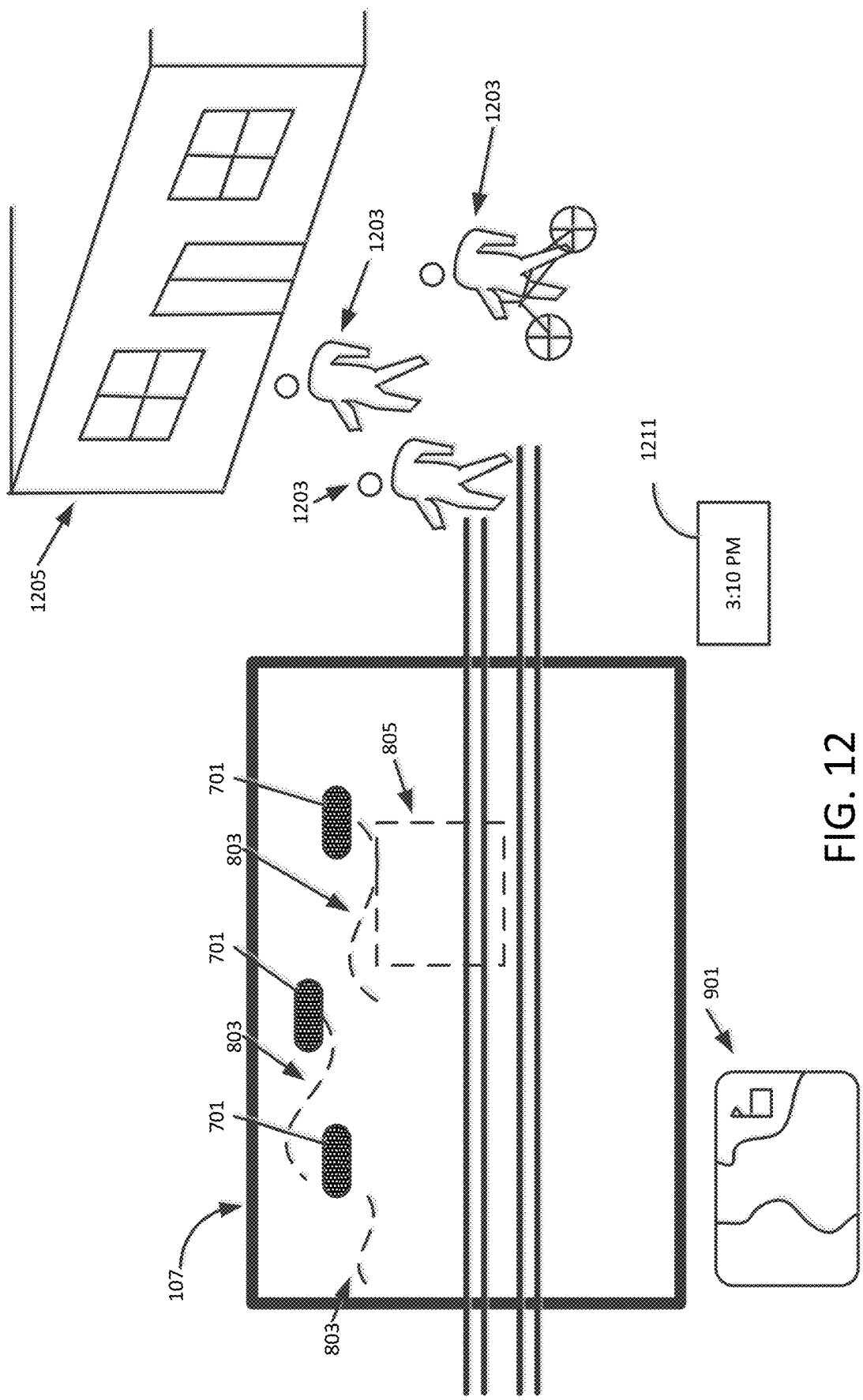
FIG. 12 is a schematic of a 3-D augmented reality display according to an exemplary aspect of the disclosure.

A time contextualization (YES in S513) may also impact the appearance of entities. FIG. 12 is a schematic of a 3-D augmented reality display according to an exemplary aspect of the disclosure. In an exemplary aspect, when the moving vehicle approaches a school 1205 (detected on a map 901) at the time 1211 that students 1203 are being let out, this time context may trigger, for example, the appearance of graphic entities related to the category "student" (backpacks, bicycles, books). The 3-D augmented reality display 107 may be modified to show students, represented as a bounding box 805, crossing at a crosswalk. Graphic entities 701 will have their trajectories 803 adjusted to avoid the path of the bounding box 805. In some embodiments, real students, bicycles, and other moving real elements may be detected by a camera mounted on the vehicle. Bounding boxes and trajectories may be determined as the real elements are detected. Detection of real elements may lead to appearance of fewer graphic entities. In some embodiments, when the number of bounding boxes takes up a majority of the display scene 107, generation of graphic entities may be stopped.

Figure 13:
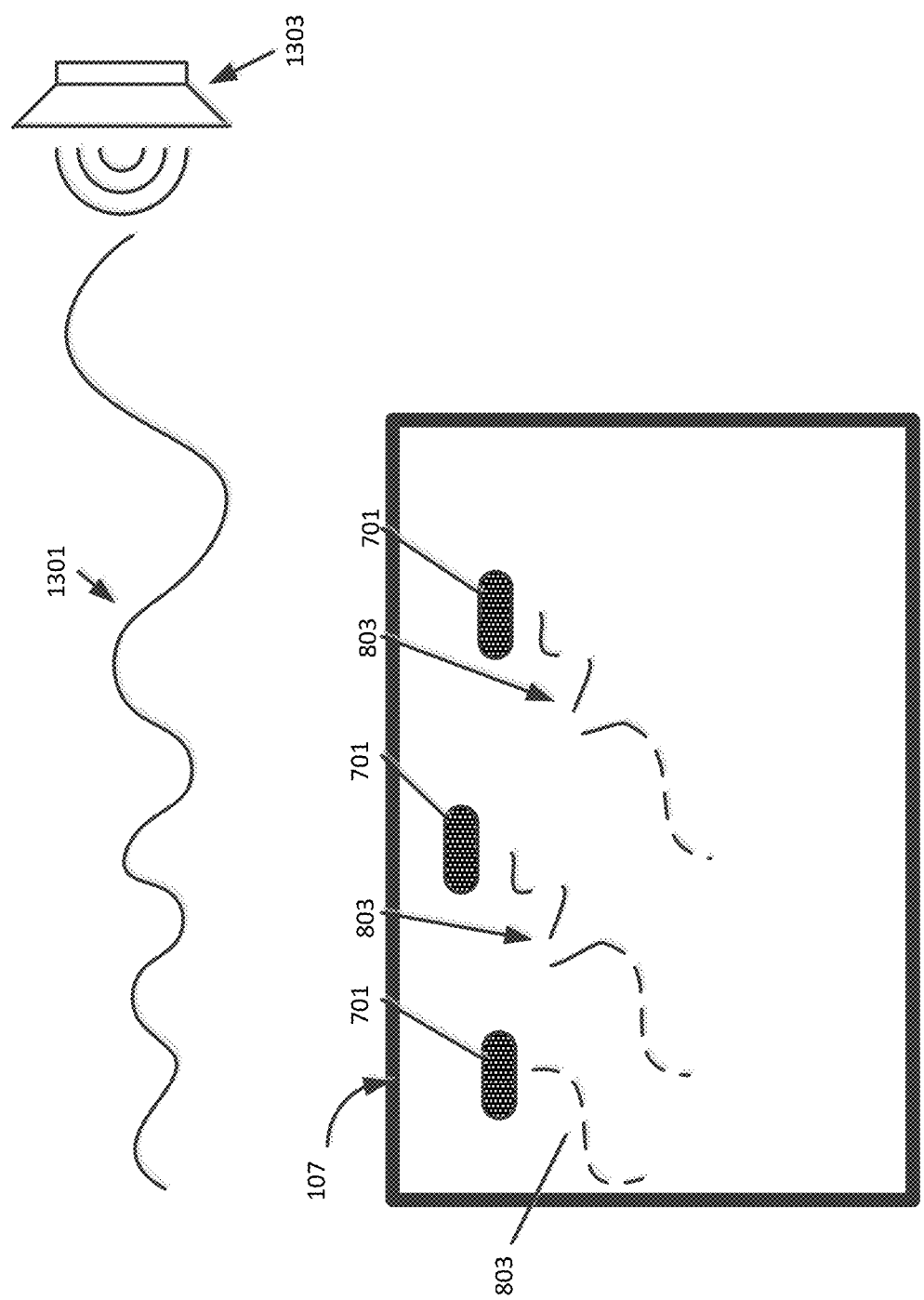
FIG. 13 is a schematic of a 3-D augmented reality display according to an exemplary aspect of the disclosure.

In some embodiments, a vehicle may include a sound system that plays music or other audio content. In some embodiments, music may be used as a condition together with other conditions that may affect the movement/appearance of graphic entities. For example, Reggae music can generate smoke floating on a road. Hip hop music may generate a skateboard rolling on a road. As another example: the loudness of some frequencies may impact the trajectory of the entities. A power estimator for some frequencies may be used to evaluate the perceived loudness, and a proportional amount of acceleration may be added to the entity. In such case, the entity would thus be controlled and some light movements would be added following, for instance, the rhythm of the music. In addition to the various sensors for detecting the outside environment of the vehicle, one or more internal sensors may be used to detect conditions inside the vehicle cabin. Among internal sensors, a microphone may be used to input audio content, such as music. Alternatively, audio content may be piped directly to the 3-D augmented reality system. The music being listened to inside the vehicle (YES in S517) may also change behavior and/or cause the generation of 3-D graphic entities. In an exemplary aspect, in S519, the speed and/or appearance of 3-D graphic entities may be based on the power and frequency range of the sound signal estimated, for example, by fast Fourier transforms. FIG. 13 is a schematic of a 3-D augmented reality display according to an exemplary aspect of the disclosure. In response to an estimated sound signal that is determined based on music 1301 from a speaker 1303, the trajectories 803 of graphic entities may be emphasized in proportion to the power and frequency of the sound.

Further, audio streams containing repetitive announcements (e.g., advertisements, flash information) detected by a specific algorithm (YES in S521) may, in S523, trigger specific actions, for example: the appearance of visual advertisements, the addition of sound patterns, or even the total omission of audio (in the system). A player of the 3-D augmented reality display may be provided with an option of blocking audio commercials staged in the 3-D augmented reality display.

Each of the functions of the described embodiments may be implemented by one or more processing circuits. A processing circuit includes a programmed processor, as a processor includes circuitry. A processing circuit may also include devices such as an application specific integrated circuit (ASIC) and conventional circuit components arranged to perform the recited functions. Note that circuitry refers to a circuit or system of circuits. The circuitry may be in one circuit board or may be distributed in several interconnected circuit boards.

In one implementation, the functions and processes of the in-vehicle computer network 110 may utilize an In-Vehicle-Infotainment system. Most automobile manufactures offer In-Vehicle-Infotainment systems in their new vehicles, or as optional upgrades. An In-Vehicle-Infotainment system may be based on an underlying computer hardware platform. A computer hardware platform may be made up of one or more circuit boards mounted in a vehicle interior, for example, inside of the vehicle dashboard or in a rear location in a trunk or sidewall. The circuit boards may be connected to one or more display devices, as well as audio components and various sensors mounted at various locations throughout the vehicle.

Several hardware platforms are available from third-party manufacturers. Most computer hardware platforms offer support for one or more display devices and connectivity for external devices such as smartphones, tablets, or other external electronic devices. Many of the computer hardware platforms provide sensor inputs for connection to cameras and other types of sensor devices. Some computer hardware platforms incorporate support for graphics processing that may be used by video games and other video entertainment. Some computer hardware platforms offer specialized processing for voice and/or face and/or object recognition, and security features such as fingerprint identification.

Figure 14:
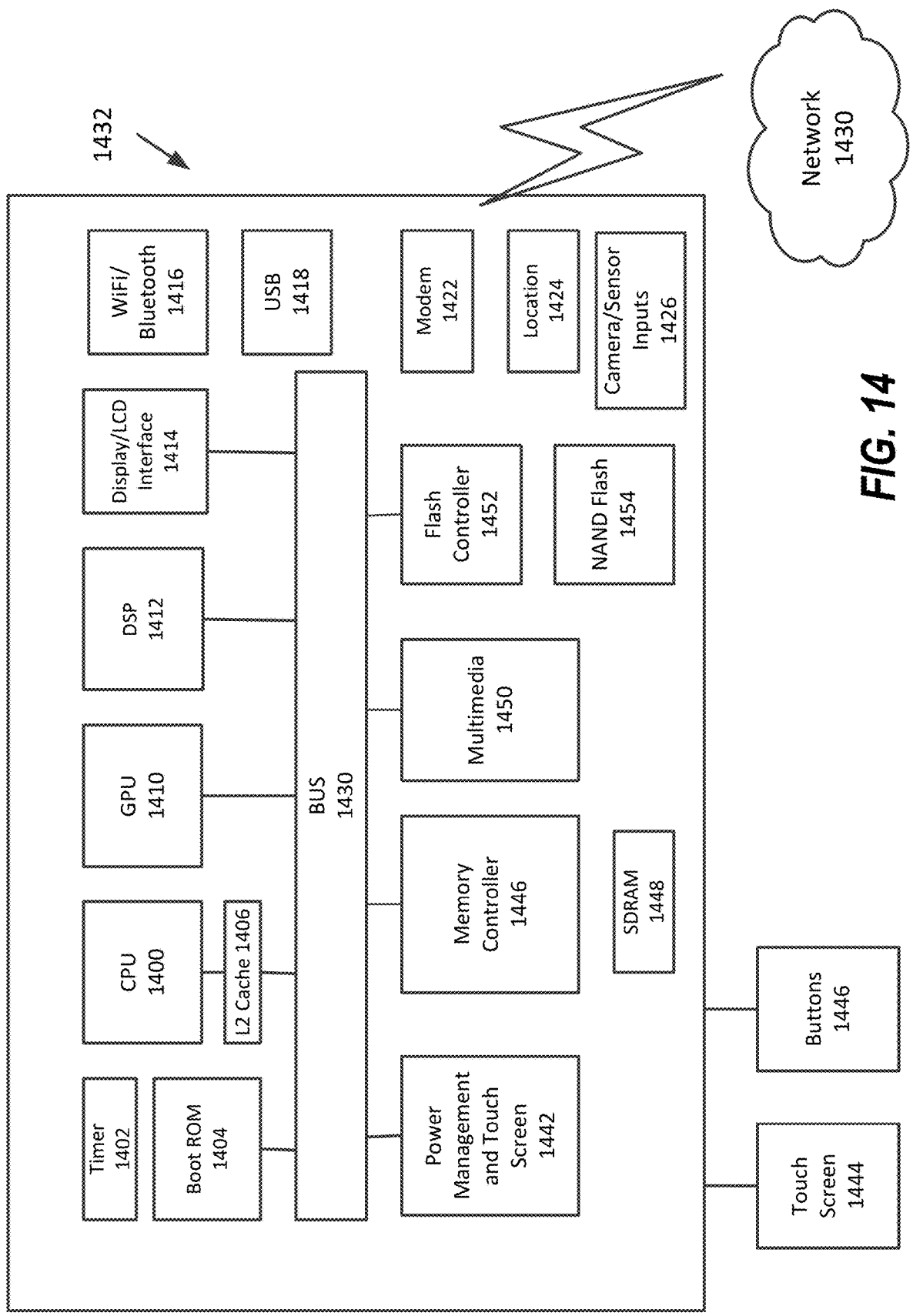
FIG. 14 is a block diagram for an in-vehicle computer network system according to an exemplary aspect of the disclosure.

A description of an exemplary computer hardware platform 1432 is described with reference to FIG. 14. In FIG. 14, the computer hardware platform 1432 includes a CPU 1400 which controls many of the processes described herein. The CPU 1400 may perform many of the services of the on-board operating system in conjunction with specialized processes that are performed by a Graphics Processing Unit (GPU) 1410 and/or a Digital Signal Processor (DSP) 1412.

In order to achieve the computer hardware platform 1432, the hardware elements may be realized by various circuitry elements. For example, CPU 1400 may be a quad-core ARM processor, or a low power processor such as an Intel Atom processor, or may be other processor types. The CPU 1400 may also include a Cache 1406. Alternatively, the CPU 1400 may be implemented on an FPGA, ASIC, PLD or using discrete logic circuits. Further, CPU 1400 may be implemented as multiple processors cooperatively working in parallel to perform the instructions of the inventive processes described above.

The process data and instructions may be stored in memory, such as SDRAM 1448. Further, the claimed advancements are not limited by the form of the computer-readable media on which the instructions of the inventive process are stored. For example, the instructions may be stored on removable non-transitory computer-readable storage media including magnetic disks, CDs, DVDs, Blu Ray disks, Flash drives, SD cards to name a few, stored in FLASH memory, RAM, ROM, PROM, EPROM, EEPROM, or stored in a hard disk or any other information processing device with which the hardware platform 1432 communicates, such as a server or external computer.

Further, the claimed advancements may be provided as a utility application, background daemon, or component of an operating system, or combination thereof, executing in conjunction with CPU 1400 and an operating system such as LINUX®, a Microsoft operating system, Android OS and other systems known to those skilled in the art.

The CPU 1400 may also perform specialized processes in conjunction with a GPU 1410 and/or a DSP 1412. The GPU 1410 may support graphics processing operations using DirectX, geometry shading, hardware tessellation, programmable blending, to name a few. The DSP 1412 may support operations for computer vision, object recognition, and various functions related to ADAS.

Other special purpose devices include a timer 1402, a boot ROM 1404, power management and touch screen control 1442, flash such as NAND flash 1454 and an associated flash controller 1452.

The computer hardware platform 1432 in FIG. 14 may also include various communications processors, including a short and/or medium range communications device such as Bluetooth processor and WiFi processor 1416, a modem 1422 for cellular communication such as 4G LTE, 5G, and the like, and a location processor such as GPS processor 1424. As can be appreciated, the network 1430 can be a public network, such as the Internet, or a private network such as LAN or WAN network, or any combination thereof and can also include PSTN or ISDN sub-networks. The network 1430 can also be wired, such as an Ethernet network, or can be wireless. The hardware platform 1432 may include connectivity in the form of one or more USB ports, HDMI ports, Controller Area Network (CAN) inputs, Digital Video inputs, and audio outputs 1418.

The computer hardware platform 1432 further includes support for one or more display devices via a video processor 1450 and a Display/LCD interface 1414. The computer hardware platform 1432 may include one or more touch screens 1444, buttons 1446.

The computer hardware platform 1432 may include input connections 1426 for one or more cameras and/or other sensors.

In one implementation, the functions and processes of the mobile device 120 may be implemented by one or more respective processing circuits 1526. As noted above, a processing circuit includes a programmed processor as a processor includes circuitry. A processing circuit may also include devices such as an application specific integrated circuit (ASIC) and conventional circuit components arranged to perform the recited functions. Note that circuitry refers to a circuit or system of circuits. Herein, the circuitry may be in one circuit board or may be distributed in several interconnected circuit boards.

Figure 15:
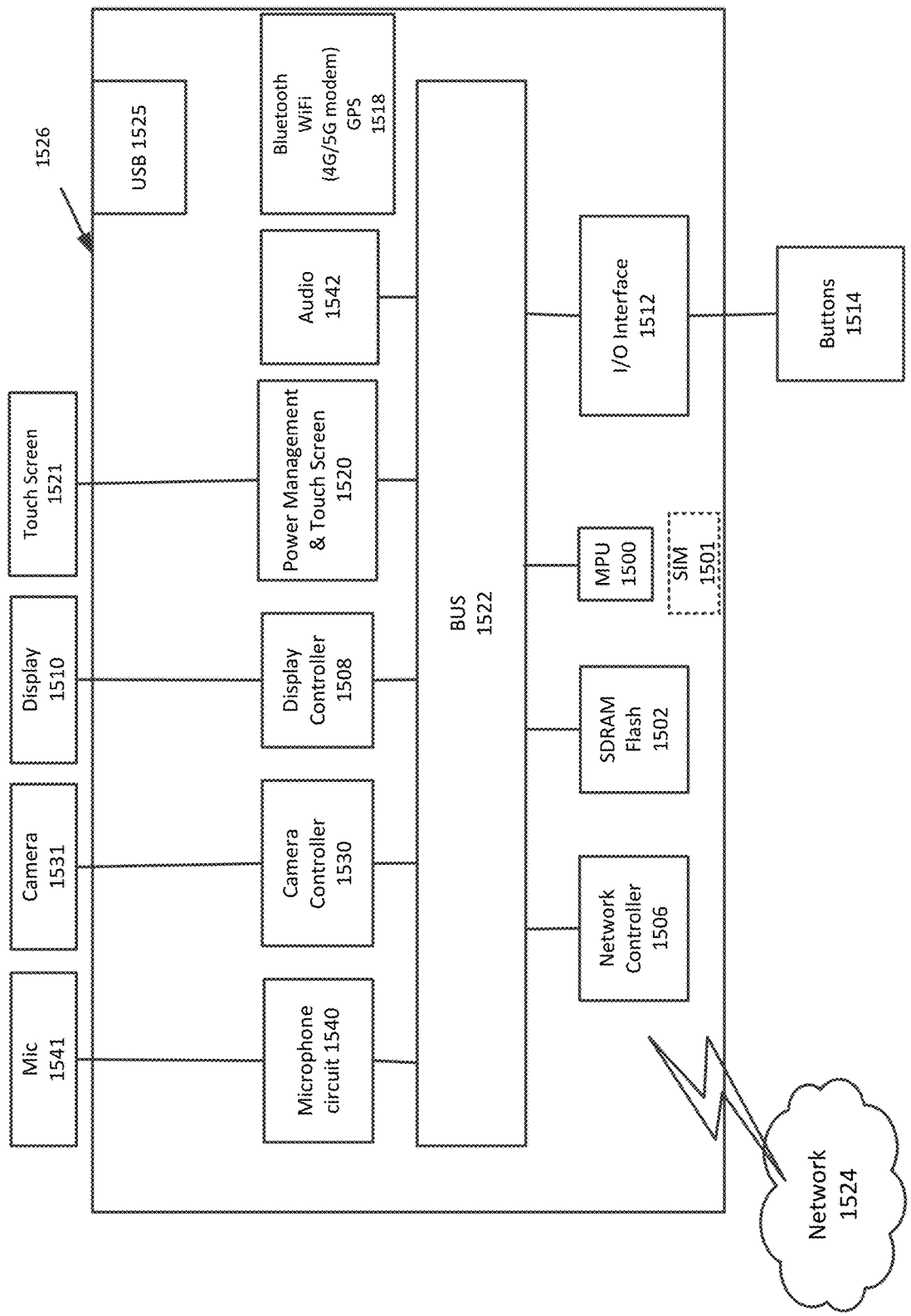
FIG. 15 is a block diagram for a mobile device according to an exemplary aspect of the disclosure.

Next, a hardware description of the processing circuit 1526 according to exemplary embodiments is described with reference to FIG. 15. In FIG. 15, the processing circuit 1526 includes a Mobile Processing Unit (MPU) 1500 which may perform processes described herein. The process data and instructions may be stored in memory 1502. These processes and instructions may also be stored on a portable storage medium or may be stored remotely. The processing circuit 1526 may have a replaceable Subscriber Identity Module (SIM) 1501 that contains information that is unique to a cellular service of the mobile device 130.

Further, the claimed advancements are not limited by the form of the computer-readable media on which the instructions of the inventive process are stored. For example, the instructions may be stored in FLASH memory, Secure Digital Random Access Memory (SDRAM), Random Access Memory (RAM), Read Only Memory (ROM), Programmable Read-Only Memory (PROM), Erasable Programmable Read-Only Memory (EPROM), Electrically Erasable Programmable Read Only Memory (EEPROM), solid-state hard disk or any other information processing device with which the processing circuit 1526 communicates, such as a server or computer.

Further, the claimed advancements may be provided as a utility application, background daemon, or component of an operating system, or combination thereof, executing in conjunction with MPU 1500 and a mobile operating system such as Android, Microsoft® Windows® 10 Mobile, Apple iOS® and other systems known to those skilled in the art.

In order to achieve the processing circuit 1526, the hardware elements may be realized by various circuitry elements, known to those skilled in the art. For example, MPU 1500 may be a Qualcomm mobile processor, a Nvidia mobile processor, a Atom® processor from Intel Corporation of America, a Samsung mobile processor, or a Apple A7 mobile processor, or may be other processor types. Alternatively, the MPU 1500 may be implemented on an Field-Programmable Gate Array (FPGA), Application Specific Integrated Circuit (ASIC), Programmable Logic Device (PLD) or using discrete logic circuits. Further, MPU 1500 may be implemented as multiple processors cooperatively working in parallel to perform the instructions of the inventive processes described above.

The processing circuit 1526 in FIG. 15 also includes a network controller 1506, such as an Intel Ethernet PRO network interface card from Intel Corporation of America, for interfacing with network 1524. As can be appreciated, the network 1524 can be a public network, such as the Internet, or a private network such as LAN or WAN network, or any combination thereof and can also include PSTN or ISDN sub-networks. The network 1524 can also be wired, such as an Ethernet network. The processing circuit may include various types of communications processors 1518 for wireless communications including 3G, 4G and 5G wireless modems, WiFi®, Bluetooth®, GPS, or any other wireless form of communication that is known.

The processing circuit 1526 includes a Universal Serial Bus (USB) controller 1525 which may be managed by the MPU 1500.

The processing circuit 1526 further includes a display controller 1508, such as a NVIDIA® GeForce® GTX or Quadro® graphics adaptor from NVIDIA Corporation of America for interfacing with display 1510. An I/O interface 1512 interfaces with buttons 1514, such as for volume control. In addition to the I/O interface 1512 and the display 1510, the processing circuit 1526 may further include a microphone 1541 and one or more cameras 1531. The microphone 1541 may have associated circuitry 1540 for processing the sound into digital signals. Similarly, the camera 1531 may include a camera controller 1530 for controlling image capture operation of the camera 1531. In an exemplary aspect, the camera 1531 may include a Charge Coupled Device (CCD). The processing circuit 1526 may include an audio circuit 1542 for generating sound output signals, and may include an optional sound output port.

The power management and touch screen controller 1520 manages power used by the processing circuit 1526 and touch control. The communication bus 1522, which may be an Industry Standard Architecture (ISA), Extended Industry Standard Architecture (EISA), Video Electronics Standards Association (VESA), Peripheral Component Interface (PCI), or similar, for interconnecting all of the components of the processing circuit 1526. A description of the general features and functionality of the display 1510, buttons 1514, as well as the display controller 1508, power management controller 1520, network controller 1506, and I/O interface 1512 is omitted herein for brevity as these features are known.

A system which includes the features in the foregoing description provides numerous advantages. In particular, a real time 3-D augmented reality system may use real scenes from a vehicle, as it travels along a vehicle path, both stopping and moving. As a result of the embodiments set forth herein, processing of 3-D augmented reality is greatly simplified by adjusting trajectories of generated graphic entities to avoid projected trajectories of real elements approaching from outside the field of view of the vehicle's windshield. 3-D augmented reality can be performed in real-time to ensure immersion of a player in a 3-D augmented reality involving a dynamic scene. Also the user experience is enhanced by triggering appearance of graphic entities in response to vehicle sensor information. Further, complex 3-D augmented reality scenarios can be displayed without requiring a substantial increase in processing complexity.

Obviously, numerous modifications and variations are possible in light of the above teachings. It is therefore to be understood that within the scope of the appended claims, the invention may be practiced otherwise than as specifically described herein.

The above disclosure encompasses the embodiments listed below.

(1) A 3-D augmented reality display system in a vehicle. The 3-D augmented reality display system including a display device configured to display a field of view of a windshield of the vehicle, and a computer hardware platform. The computer hardware platform including circuitry configured to receive a video image from a view of a front of the vehicle, extract a portion of the video image matching the field of view of the windshield for display on the display device, generate and display a 3-D graphic entity superimposed on the display device and moving along a predetermined trajectory, receive sensory data related to the environment outside the field of view of the windshield, and when the sensory data indicates a real element having a trajectory path that is approaching the field of view of the windshield, generate a bounding box around the real element and adjust the trajectory path of the 3-D graphic entity to a new trajectory path that avoids the trajectory path of the bounding box for the real element.

(2) The 3-D augmented reality display system of feature (1), in which the sensory data includes GPS data, and in which the trajectory path of the 3-D graphic entity is determined from a map and a position of the vehicle as determined using the GPS data.

(3) The 3-D augmented reality display system of feature (1), in which the sensory data includes images captured by a camera outside a peripheral view of the front windshield of the vehicle.

(4) The 3-D augmented reality display system of feature (3), in which the circuitry is configured to determine that the captured images indicate another vehicle moving alongside the vehicle towards the field of view of the front windshield of the vehicle.

(5) The 3-D augmented reality display system of feature (3), in which the circuitry is configured to determine that the captured images indicate a crosswalk sign, and adjust movement of the 3-D graphic entity in proportion to slowing of the vehicle due to the detected crosswalk sign.

(6) The 3-D augmented reality display system of feature (5), in which the circuitry is configured to determine that the captured images indicate a person standing at a crosswalk, and adjust movement of the 3-D graphic entity to move in a new trajectory path that avoids a walking path of the person.

(7) The 3-D augmented reality display system of feature (2), in which the map indicates a school building along a route where the vehicle is traveling, and in which the circuitry is configured to generate graphic entities associated with a category of the school building, including school students playing in a school playground.

(8) The 3-D augmented reality display system of feature (2), in which the circuitry is configured to detect a time of day, in which the map indicates a school building in a vicinity of a route where the vehicle is traveling, and in which the circuitry is configured to generate students walking and riding bicycles based on the detection that the time of day is the time that the school dismisses the students.

(9) The 3-D augmented reality display system of feature (1), in which the circuitry is configured to adjust rate of movement of the 3-D graphic entity based on a power and a frequency of a music sound signal.

(10) The 3-D augmented reality display system of feature (1), in which the circuitry is configured to modify the 3-D graphic entity to add graphic entities related to a climate condition.

(11) The 3-D augmented reality display of feature (2), in which the circuitry is configured to receive sensor information from a temperature sensor and an image captured by a camera, and when the map indicates a rural area, the captured image is mostly white, and the information from the temperature sensor indicates a temperature below freezing, generate content for display based on the sensor information and the image captured by the camera.

(12) A method including receiving, using circuitry, a video image from a view of a front of a vehicle; extracting, using the circuitry, a portion of the video image matching the field of view of the windshield for display on a display device; generating and displaying, using the circuitry, a 3-D graphic entity superimposed on the display device and moving along a predetermined trajectory; receiving, using the circuitry, sensory data related to an environment outside the field of view of the windshield; when the sensory data indicates a real element having a trajectory path that is approaching the field of view of the windshield, generating a bounding box around the real element and adjusting the trajectory path of the 3-D graphic entity to a new trajectory path that avoids the trajectory path of the bounding box for the real element.

(13) The method of feature (12), in which the sensory data includes GPS data, the method further including determining, using the circuitry, a trajectory path of the 3-D graphic entity from a map and a position of the vehicle as determined using the GPS data.

(14) The method of feature (12), in which the sensory data images captured by a camera outside the peripheral view of the front windshield of the vehicle, the method further including determining, using the circuitry, that the captured images indicate another vehicle moving alongside the vehicle towards the field of view of the front windshield of the vehicle.

(15) The method of feature (14), further including determining, using the circuitry, that the captured images indicate a crosswalk sign; and adjusting, using the circuitry, movement of the 3-D graphic entity in proportion to slowing of the vehicle due to the detected crosswalk sign.

(16) The method of feature (15), further including determining, using the circuitry, that the captured images indicate a person standing at the crosswalk; and adjusting, using the circuitry, movement of the 3-D graphic entity to move in a trajectory path that avoids a walking path of the person.

(17) The method of feature (12), further including adjusting, using the circuitry, rate of movement of the 3-D graphic entity based on power and frequency of s music sound signal.

(18) The method of feature (12), further including modifying, using the circuitry, the 3-D graphic entity to add graphic entities related to a climate condition.

(19) A non-transitory computer-readable storage medium including computer executable instructions, in which the instructions, when executed by a computer, cause the computer to perform a method. The method including receiving a video image from a view of a front of a vehicle; extracting, using the circuitry, a portion of the video image matching the field of view of the windshield for display on a display device; generating and displaying a 3-D graphic entity superimposed on the display device and moving along a predetermined trajectory; receiving sensory data related to an environment outside the field of view of the windshield; when the sensory data indicates a real element having a trajectory path that is approaching the field of view of the windshield, generating a bounding box around the real element and adjusting the trajectory path of the 3-D graphic entity to a new trajectory path that avoids the trajectory path of the bounding box for the real element.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A 3-D augmented reality display system in a vehicle, the 3-D augmented reality display system comprising:
 a display device configured to display a field of view of a windshield of the vehicle; and
 a computer hardware platform including circuitry configured to
  receive a video image from a view of a front of the vehicle,
  extract a portion of the video image matching the field of view of the windshield for display on the display device,
  generate and display a 3-D graphic entity superimposed on the display device and moving along a predetermined trajectory path,
  receive sensory data related to the environment outside the field of view of the windshield,
  when the sensory data indicates a real element outside the field of view of the windshield,
   determine a projected trajectory path of the real element representing a likely movement of the real element from outside the field of view of the windshield to inside the field of view of the windshield,
   generate a bounding box around the real element at a position where the projected trajectory path of the real element intersects the predetermined trajectory path of the 3-D graphic entity, and modify the predetermined trajectory path of the 3-D graphic entity to a new trajectory path that avoids the bounding box around the real element to avoid overlap of the 3-D graphic entity and the real element.

2. The 3-D augmented reality display system of claim 1, wherein the sensory data includes GPS data, and
wherein the predetermined trajectory path of the 3-D graphic entity is determined from a map and a position of the vehicle as determined using the GPS data.

3. The 3-D augmented reality display system of claim 1, wherein the windshield is a front windshield,
wherein the sensory data includes images, captured by a camera, of the environment outside a peripheral view of the front windshield of the vehicle.

4. The 3-D augmented reality display system of claim 3, wherein the circuitry is configured to determine that the captured images indicate another vehicle, as the real element, moving alongside the vehicle outside the field of view of the front windshield of the vehicle.

5. The 3-D augmented reality display system of claim 3, wherein the circuitry is configured to
determine that the captured images indicate a crosswalk sign, and
modify movement of the 3-D graphic entity in proportion to slowing of the vehicle due to the detected crosswalk sign.

6. The 3-D augmented reality display system of claim 5, wherein the circuitry is configured to
determine that the captured images indicate a person standing adjacent to the crosswalk sign, and
modify movement of the 3-D graphic entity to move in the new trajectory path that avoids a walking path of the person along a crosswalk associated with the crosswalk sign.

7. The 3-D augmented reality display system of claim 2, wherein the map indicates a school building along a route where the vehicle is traveling, and
wherein the circuitry is configured to generate graphic entities associated with a category of the school building, including school students playing in a school playground.

8. The 3-D augmented reality display system of claim 2, wherein the circuitry is configured to detect a time of day,
wherein the map indicates a school building in a vicinity of a route where the vehicle is traveling, and
wherein the circuitry is configured to generate students walking and riding bicycles based on the detection that the time of day is the time that the school dismisses the students.

9. The 3-D augmented reality display system of claim 1, wherein the circuitry is configured to adjust rate of movement of the 3-D graphic entity based on a power and a frequency of a music sound signal.

10. The 3-D augmented reality display system of claim 1, wherein the sensory data indicates a climate condition,
wherein the circuitry is configured to modify the 3-D graphic entity to add graphic entities related to the climate condition.

11. The 3-D augmented reality display of claim 2, wherein the circuitry is configured to
receive sensor information from a temperature sensor and an image captured by a camera, and
when the map indicates a rural area, the captured image is white, and the information from the temperature sensor indicates a temperature below freezing, generate content for display based on the sensor information and the image captured by the camera.

12. A method comprising:
receiving, using circuitry, a video image from a view of a front of a vehicle;
extracting, using the circuitry, a portion of the video image matching the field of view of the windshield for display on a display device;
generating and displaying, using the circuitry, a 3-D graphic entity superimposed on the display device and moving along a predetermined trajectory path;
receiving, using the circuitry, sensory data related to an environment outside the field of view of the windshield; and
when the sensory data indicates a real element outside the field of view of the windshield,
determining a projected trajectory path of the real element representing a likely movement of the real element from outside the field of view of the windshield to inside the field of view of the windshield,
generating a bounding box around the real element at a position where the projected trajectory path of the real element intersects the predetermined trajectory path of the 3-D graphic entity, and
modifying the predetermined trajectory path of the 3-D graphic entity to a new trajectory path that avoids the trajectory path of the bounding box around the real element to avoid occlusion overlap of the 3-D graphic entity and the real element.

13. The method of claim 12, wherein the sensory data includes GPS data, the method further comprising determining, using the circuitry, the predetermined trajectory path of the 3-D graphic entity from a map and a position of the vehicle as determined using the GPS data.

14. The method of claim 12, wherein the sensory data includes images captured by a camera outside a peripheral view of a front windshield of the vehicle,
the method further comprising determining, using the circuitry, that the captured images indicate another vehicle, as the real element, moving alongside the vehicle outside the field of view of the front windshield of the vehicle.

15. The method of claim 14, further comprising
determining, using the circuitry, that the captured images indicate a crosswalk sign; and
modifying, using the circuitry, movement of the 3-D graphic entity in proportion to slowing of the vehicle due to the detected crosswalk sign.

16. The method of claim 15, further comprising
determining, using the circuitry, that the captured images indicate a person standing adjacent to the crosswalk sign; and
modifying, using the circuitry, movement of the 3-D graphic entity to move in the new trajectory path that avoids a walking path of the person along crosswalk associated with the crosswalk sign.

17. The method of claim 12, further comprising modifying, using the circuitry, rate of movement of the 3-D graphic entity based on power and frequency of a music sound signal.

18. The method of claim 12, wherein the sensory data indicates a climate condition, the method further comprising modifying, using the circuitry, the 3-D graphic entity to add graphic entities related to the climate condition.

19. A non-transitory computer-readable storage medium including computer executable instructions, wherein the instructions, when executed by a computer, cause the computer to perform a method, the method comprising:

receiving a video image from a view of a front of a vehicle;

extracting, using the circuitry, a portion of the video image matching the field of view of the windshield for display on a display device;

generating and displaying a 3-D graphic entity superimposed on the display device and moving along a predetermined trajectory path;

receiving sensory data related to an environment outside the field of view of the windshield; and when the sensory data indicates a real element outside the field of view of the windshield, determining a projected trajectory path of the real element representing a likely movement of the real element from outside the field of view of the windshield to inside the field of view of the windshield, generating a bounding box around the real element at a position where the projected trajectory path of the real element intersects the predetermined trajectory path of the 3-D graphic element, and modifying the projected trajectory path of the 3-D graphic entity to a new trajectory path that avoids of the bounding box around the real element to avoid of the 3-D graphic entity and the real element.

20. The 3-D augmented reality display system of claim 1, further comprising:

displaying the 3-D graphic object moving along the new trajectory path that avoids the projected trajectory path of the non-displayed bounding box for the real element.

* * * * *